(12) United States Patent
Gilliom

(10) Patent No.: US 8,786,211 B2
(45) Date of Patent: Jul. 22, 2014

(54) CURRENT CONTROL FOR SIMO CONVERTERS

(75) Inventor: Michael Gilliom, Raleigh, NC (US)

(73) Assignee: Cree, Inc., Durham, NC (US)

( * ) Notice: Subject to any disclaimer, the term of this patent is extended or adjusted under 35 U.S.C. 154(b) by 137 days.

(21) Appl. No.: 13/327,495

(22) Filed: Dec. 15, 2011

(65) Prior Publication Data

US 2013/0154507 A1 Jun. 20, 2013

(51) Int. Cl.
H02M 3/158 (2006.01)
H05B 37/02 (2006.01)

(52) U.S. Cl.
USPC .......................... 315/297; 315/217; 323/267

(58) Field of Classification Search
USPC .............. 315/297, 294, 307, 210, 212, 217;
307/82, 41; 323/267, 271, 272, 282,
323/288; 363/20, 21.12
See application file for complete search history.

(56) References Cited

U.S. PATENT DOCUMENTS

| | | |
|---|---|---|
| 5,057,986 A | 10/1991 | Henze et al. |
| 5,555,494 A | 9/1996 | Morris |
| 6,232,752 B1 | 5/2001 | Bissell |
| 6,339,360 B1 | 1/2002 | Santillano |
| 6,586,915 B1 | 7/2003 | Reeves et al. |
| 6,600,300 B2 | 7/2003 | Groeneveld et al. |
| 6,847,169 B2 | 1/2005 | Ito et al. |
| 8,232,743 B2 | 7/2012 | Chen et al. |
| 2002/0011824 A1 | 1/2002 | Sluijs |
| 2005/0036255 A1 | 2/2005 | Kranz |
| 2007/0285031 A1 | 12/2007 | Shteynberg et al. |
| 2008/0054815 A1 | 3/2008 | Kotikalapoodi et al. |
| 2008/0231115 A1* | 9/2008 | Cho et al. ................. 307/41 |
| 2009/0231552 A1 | 9/2009 | Huber et al. |
| 2010/0026267 A1 | 2/2010 | Easwaran et al. |
| 2010/0033109 A1 | 2/2010 | Liu et al. |
| 2010/0164403 A1 | 7/2010 | Liu |
| 2010/0254129 A1 | 10/2010 | Le Toquin et al. |
| 2010/0283322 A1 | 11/2010 | Wibben |
| 2010/0295472 A1 | 11/2010 | Wibben et al. |
| 2011/0032731 A1 | 2/2011 | Coleman et al. |
| 2011/0043181 A1* | 2/2011 | Jing et al. ................. 323/288 |
| 2011/0068700 A1 | 3/2011 | Fan |
| 2011/0068757 A1 | 3/2011 | Xu et al. |

(Continued)

FOREIGN PATENT DOCUMENTS

| | | |
|---|---|---|
| DE | 10 2005 056338 A1 | 5/2007 |
| WO | WO 02/03534 | 1/2002 |

OTHER PUBLICATIONS

PCT International Search Report and Written Opinion for PCT/US2012/069670 mailed May 14, 2013.

(Continued)

*Primary Examiner* — Daniel D Chang
(74) *Attorney, Agent, or Firm* — Brinks Gilson & Lione

(57) ABSTRACT

A system includes a single-inductor-multiple-out (SIMO) converter having storage circuitry in communication with a plurality of output channels, and a controller that controls and measures current flow through the SIMO converter. A signal generator may output switching signals to store current in the storage circuitry and discharge the stored current into the plurality of output channels. The discharged current may be measured and compared to a desired current draw through the output channels over a sample period. A compensator may determine whether to change one or more timing parameters used to control the flow of current through the SIMO converter.

39 Claims, 19 Drawing Sheets

(56) References Cited

U.S. PATENT DOCUMENTS

| | | |
|---|---|---|
| 2011/0254468 A1 | 10/2011 | Chen et al. |
| 2012/0032664 A1 | 2/2012 | Coleman et al. |
| 2012/0043912 A1 | 2/2012 | Huynh et al. |
| 2012/0286576 A1* | 11/2012 | Jing et al. ............... 307/43 |

OTHER PUBLICATIONS

IEEE Transactions on Circuits and Systems—11:Express Briefs, vol. 56, No. 8, Aug. 2009, "Single-Inductor—Multiple-Output Switching DC-DC Converters", Dongwon Kwon, *Graduate Student Member, IEEE*, and Gabriel A. Rincón, *Senior Member, IEEE*.

Regan Zane et al., "Modeling of High-Power-Factor Rectifiers Based on Switching Converters with Nonlinear-Carrier Control", Power Electronics Group, Department of Electrical and Computer Engineering, University of Colorado, Boulder, CO, 1996 IEEE, pp. 1105-1111.

Weiwei Xu et al., "A Dual-Mode Single-Inductor Dual-Output Switching Converter with Small Ripple", Dec. 2, 2009, pp. 1-17.

W. Tang et al., "Power Factor Correction With Flyback Converter Employing Charge Control", 1993 IEEE, pp. 293-298.

Xu Weiwei et al., "A single-inductor dual-output switching converter with average current mode control", Journal of Semiconductors, vol. 30, No. 9, Sep. 2009, pp. 095012-1 to 095012-6.

Hanh-Phuc Le et al., A Single-Inductor Switching DC-DC Converter With Five Outputs and Ordered Power-Distributive Control, IEEE Journal of Solid-State Circuits, vol. 42, No. 12, Dec. 2007, pp. 2706-2714.

Anmol Sharma et al., "A Single Inductor Multiple Output Converter with Adaptive Delta Current Mode Control", ISCAS 2006, pp. 5643-5646.

M. Belloni et al, "On the Design of Single-Inductor Multiple-Output DC-DC Buck Conveters", IEEE Int. Symposium on Circuits and Systems, ISCAS 2008, Seattle, May 18-21, 2008, pp. 3049-3052.

M. Belloni, E. Bonizzoni, F. Maloberti: "Single-Inductor Multiple-Output DC-DC Converters"; in M. Stayaert, A.H.M. Van Roermund and H. Casier Ed., "Analog Circuit Design" Springer Science, 2009, pp. 233-253.

Wing-Hung Ki et al., "Single-Inductor Multiple-Output Switching Converters", 2001 IEEE, pp. 226-231.

Daniele Trevisan et al., Digital Control of Single-Inductor Multiple-Output Step-Down DC-DC Converters in CCM, IEEE Transactions of Industrial Electronics, vol. 55, No. 9, Sep. 2008, pp. 3476-3483.

International Search Report and Written Opinion of the International Searching Authority for International Application No. PCT/US2012/069732, dated Feb. 5, 2014, 15 pages.

International Search Report for International Application No. PCT/US2012/069669, dated Feb. 6, 2014, 3 pages.

\* cited by examiner

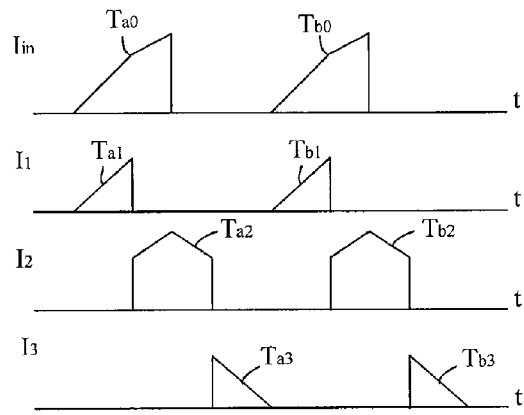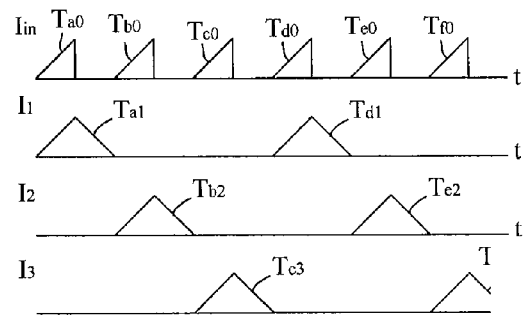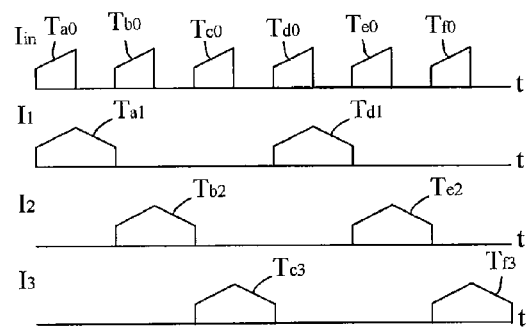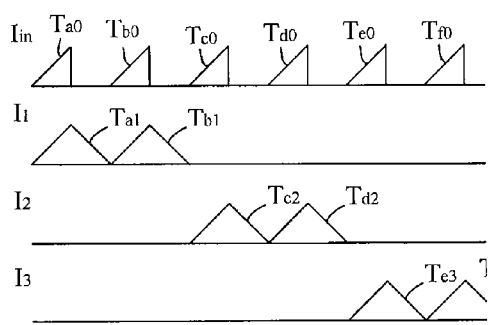
Fig. 7A
Fig. 7B
Fig. 7C
Fig. 7D
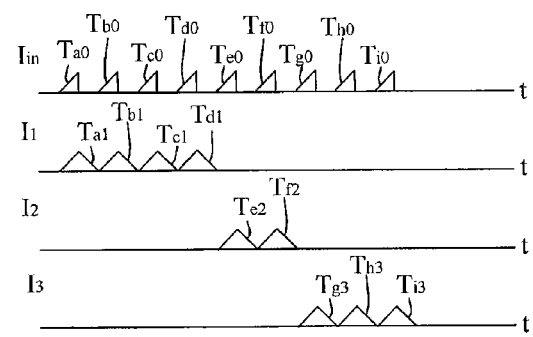
Fig. 7E

CURRENT CONTROL FOR SIMO CONVERTERS

TECHNICAL FIELD

The present disclosure relates generally to power converters, and more particularly to a system that controls current being conducted through single-inductor-multiple-output (SIMO) converters.

BACKGROUND

Power converters may be used to convert a direct current (DC) or a rectified alternating current (AC) input signal to one or more DC output signals at the same or different power levels. A single-inductor-multiple-output (SIMO) converter may store current based on receiving the input signal and discharge the stored current through multiple loads in output channels of the SIMO converter. A characteristic of the SIMO converter is the SIMO converter's conversion ratio, which is indicative of how the SIMO converter responds to configuration changes, such as changes in the input signal and switching times, as examples. The more linear that the conversion ratio is, the less susceptible that the SIMO converter to performance degradation due to the configuration changes.

BRIEF DESCRIPTION OF THE DRAWINGS

FIG. 7A shows an example current (I) versus time (t) diagram of discontinuous current conduction and consolidated sequencing through a SIMO converter having overlapping charge and discharge periods.

FIG. 7B shows an example current (I) versus time (t) diagram of discontinuous current conduction and interleaved sequencing through a SIMO converter having overlapping charge and discharge periods.

FIG. 7C shows an example current (I) versus time (t) diagram of continuous current conduction and interleaved sequencing through a SIMO converter having overlapping charge and discharge periods.

FIG. 7D shows an example current (I) versus time (t) diagram discontinuous current conduction and commutated sequencing through a SIMO converter having overlapping charge and discharge periods.

FIG. 7E shows an example current (I) versus time (t) diagram of discontinuous current conduction and an alternate commutated sequencing through a SIMO converter having overlapping charge and discharge periods.

DETAILED DESCRIPTION

Figure 1:
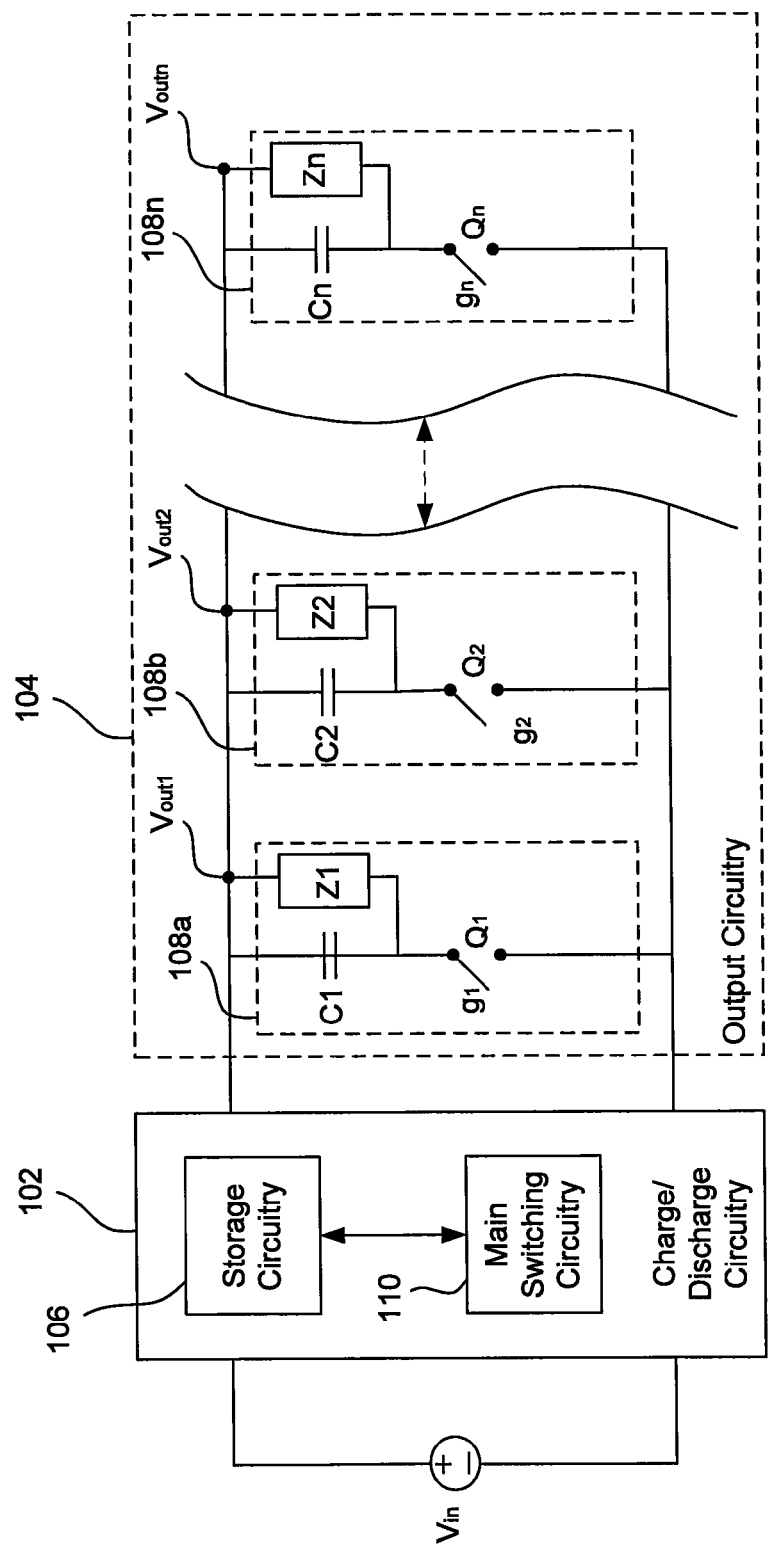
FIG. 1 shows a schematic diagram of an example SIMO converter.

The present disclosure describes systems and methods of controlling and monitoring current through a single-inductor-multiple-output (SIMO) converter. The present disclosure also describes a SIMO converter that is converted to output a predetermined and/or desired light output. The SIMO converter may comprise one of various types of SIMO converters, such as boost, buck, or flyback SIMO converters, as examples. The SIMO converter may be configured to store current during a charge period of a switching cycle, and discharge at least some of the current into a plurality of output channels or strings during a discharge period of the switching cycle. For some example SIMO converters, such as for boost and/or flyback SIMO converters, the charge period and the discharge period may be non-overlapping periods. When the SIMO converter is charging, the SIMO converter is not also discharging, and vice versa. As a result, the discharge periods may be discontiguous periods, such as discharge periods separated by periods of time where no current or substantially no current is being discharged. In other SIMO converters, such in buck SIMO converters, the charge period and the discharge period may be overlapping periods. During at least a portion of the charge period, the SIMO converter may also be discharging, or vice versa.

In some applications, SIMO converters may be used as voltage regulation modules, such as power supplies for computer. As a voltage regulation module, the SIMO converter may supply voltages to various components of the computer through loads in the plurality of output channels. In voltage regulation module applications, the SIMO converter may be configured to generate one or more voltages across the loads. The current being drawn through the load may be of little importance, or at least of lower importance, than the output voltages across the loads. In other applications, the SIMO converter may be configured to draw one or more currents through the loads. The voltage being generated across the load may be of little importance, or at least of lower importance, than the amount of current that is being drawn through each of the loads. In the latter applications, the SIMO converter may be controlled and/or monitored to achieve a predetermined and/or desired current draw through the loads, rather than to achieve a predetermined and/or desired voltage generation by the loads.

One application where the SIMO converter may be controlled and/or monitored to achieve a predetermined and/or desired current draw through the loads may be in lighting applications, such as light emitting diode (LED) lighting applications, where the loads in the output channels comprise a plurality of LEDs. Each load may comprise a single LED or a plurality of LEDs connected together. The plurality of LEDs may be connected in series, parallel, or a combination thereof. The LEDs in the channels may comprise an arrangement or a configuration, such as a red-green-blue (RGB) configuration or a blue-shifted yellow (BSY) plus red configuration, as examples. Each of the LEDs may correspond to and/or be associated with a part of the LED configuration. As an example, for the RGB configuration, each of the LEDs may correspond to a red LED, a green LED, or a red LED.

When current is drawn through the LEDs, each LED may generate, output, and/or emit a light output. The light outputs emitted by the LEDs may combine and/or mix to produce a total or overall light output. The total or overall light output may be a predetermined and/or desired light output. The predetermined and/or desired light output may include a predetermined brightness and/or a color output or color point. The desired light output of the LEDs may be dependent upon the current being conducted through the LEDs. As such, predetermined and/or desired amounts of current drawn through the LEDs may be determined in order to achieve the desired light output. The predetermined and/or desired amounts of current may depend on various factors, including a predetermined and/or desired color point or color output of the light output, a predetermined and/or desired brightness of the light output, one or more temperatures, such as operating temperatures, of the LEDs, and/or lifetime expectancies of the LEDs. The predetermined and/or desired amounts of current drawn may include a predetermined and/or total current drawn over a time period, and/or proportions of the total current drawn for each of the channels. One or more ratios of the proportions percentages of the total current drawn for each of the channels may be determined. Further, where the desired light output may change, a change in the predetermined and/or desired currents drawn through the LEDs may also be determined. The change in the predetermined and/or desired currents may include a change in the total current drawn over the time period and/or a change in the proportions of the total current drawn for each of the channels.

Each LED may require a desired current draw that is independent and/or different from desired current draws for the other LEDs in the lighting system. Power converters other than SIMO power converters may be used to draw different independent amounts of current through the multiple LEDs. For example, N-number of power converters may be used to power N-number of LEDs or LED loads. Alternatively, if the loads do not need to be independently controlled, then a single power converter that includes a transformer having N−1 secondary windings may be used. However, both examples require a large amount of storage circuitry (i.e., magnetics). A SIMO power converter may require less storage circuitry, and thus may be more desirable than non-SIMO power converters for LED lighting applications and/or other power converter applications where current conduction through a plurality of loads is controlled, monitored, and/or measured. Where the SIMO converter is used in the LED lighting applications, the output channels of the SIMO converter may be driven independent of each other, and each load (e.g., LED) may be chosen so that a combination of the output of the loads produces a predetermined and/or desired light output.

Figure 8:
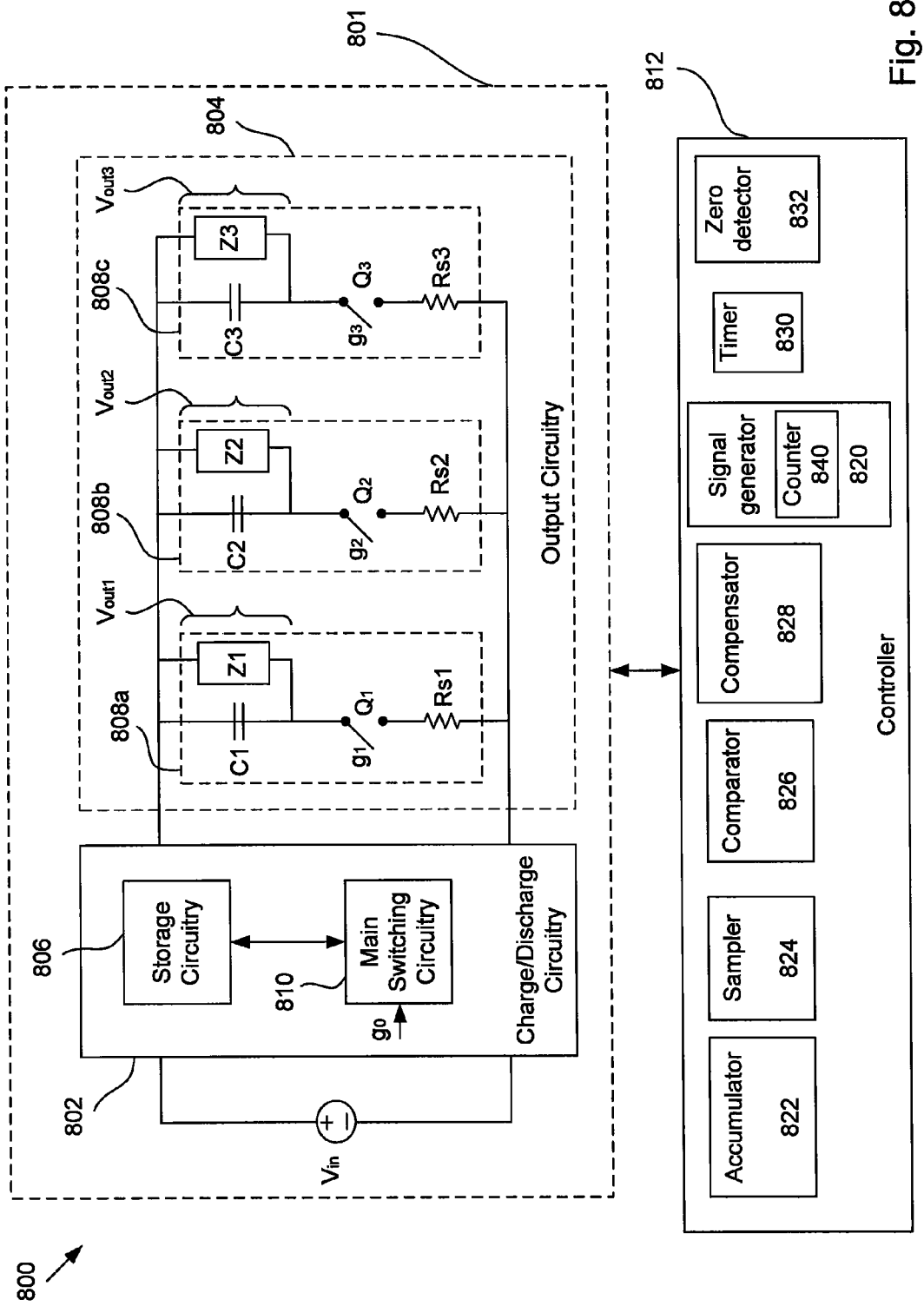
FIG. 8 shows a system comprising a SIMO converter in communication with a controller.
Figure 11:
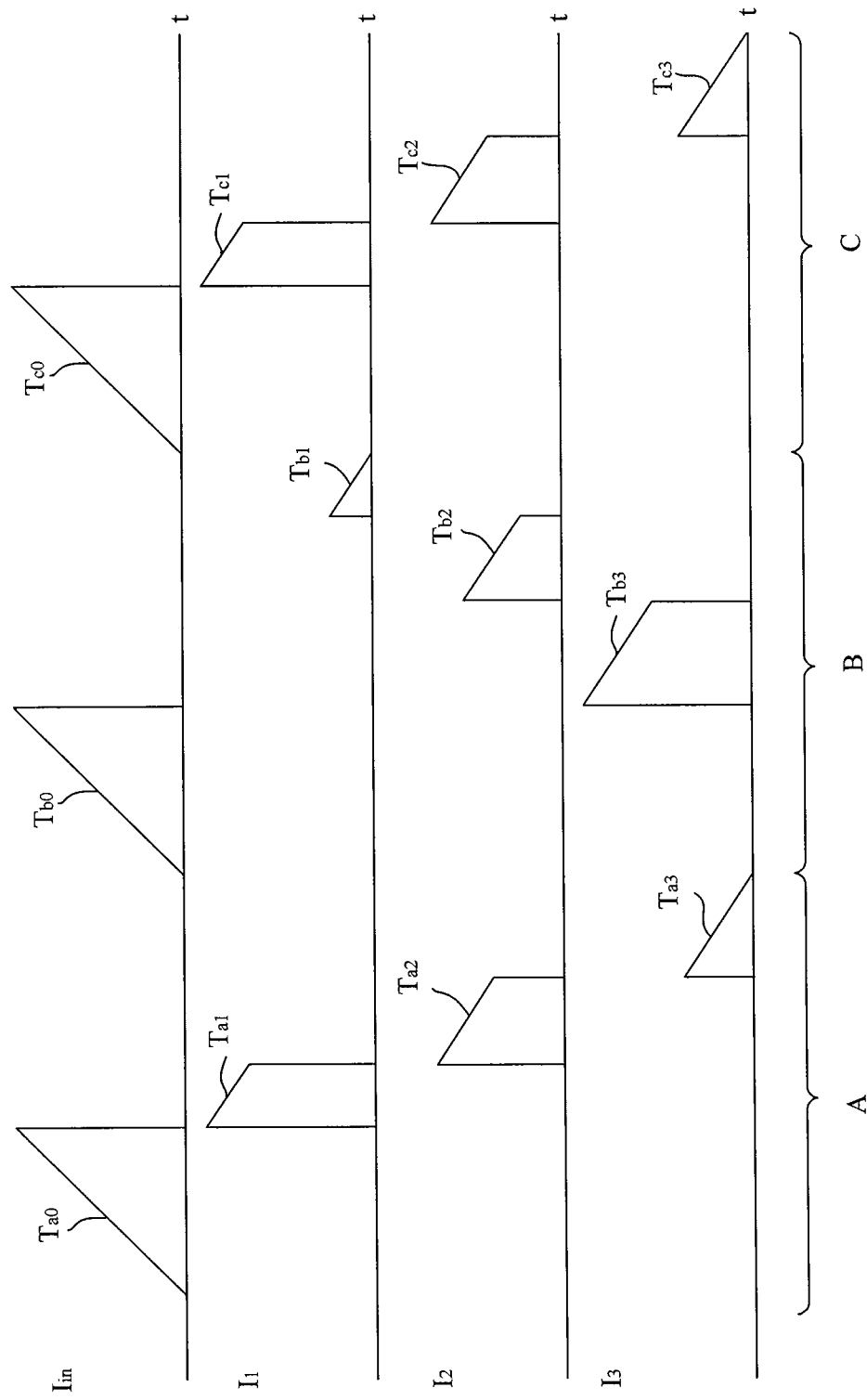
FIG. 11 shows a current (I) versus time (t) diagram of current conduction in a SIMO converter, illustrating a current order of output channel conduction being a reversed order of a previous order of output channel conduction for a SIMO converter having non-overlapping charge and discharge periods.
Figure 12:
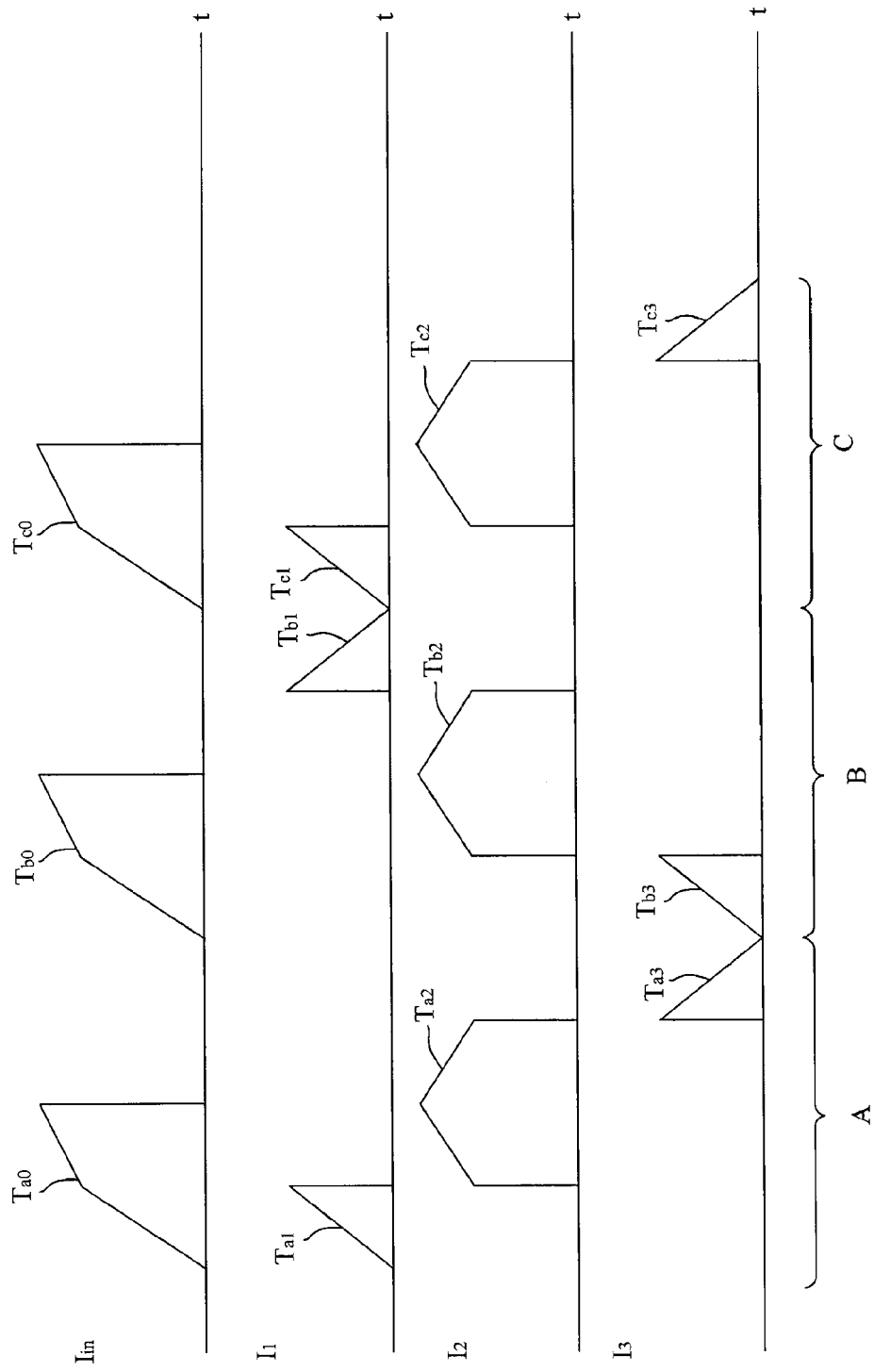
FIG. 12 shows a current (I) versus time (t) diagram of current conduction in a SIMO converter, illustrating a current order of output channel conduction being a reverse order of a previous order of output channel conduction for a SIMO converter having overlapping charge and discharge periods.
Figure 13:
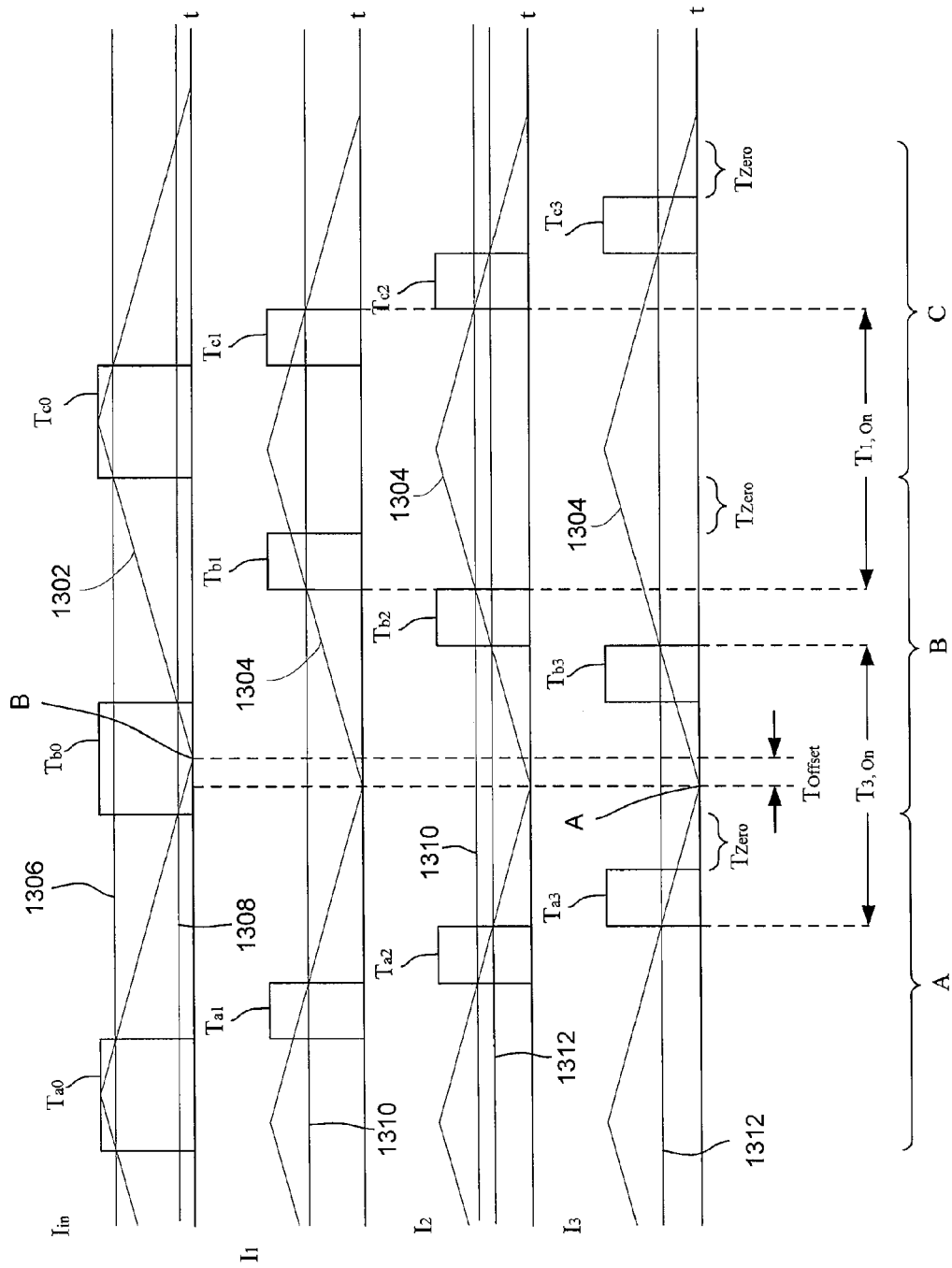
FIG. 13 shows an example switch timing diagram implementing an offset between primary and secondary counters.
Figure 14:
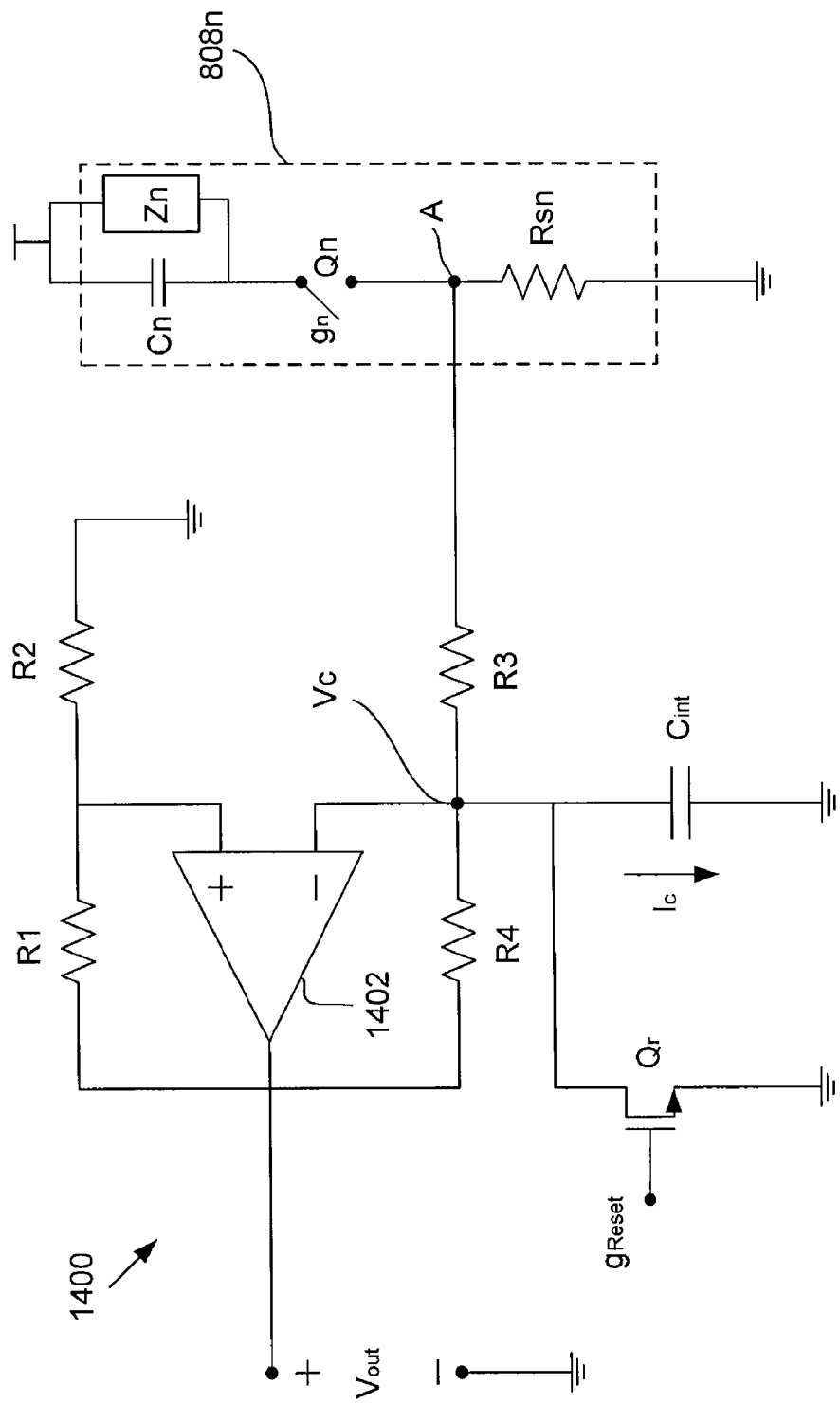
FIG. 14 shows an example integrator that may be used to determine an average current flow over a sample period.
Figure 15:
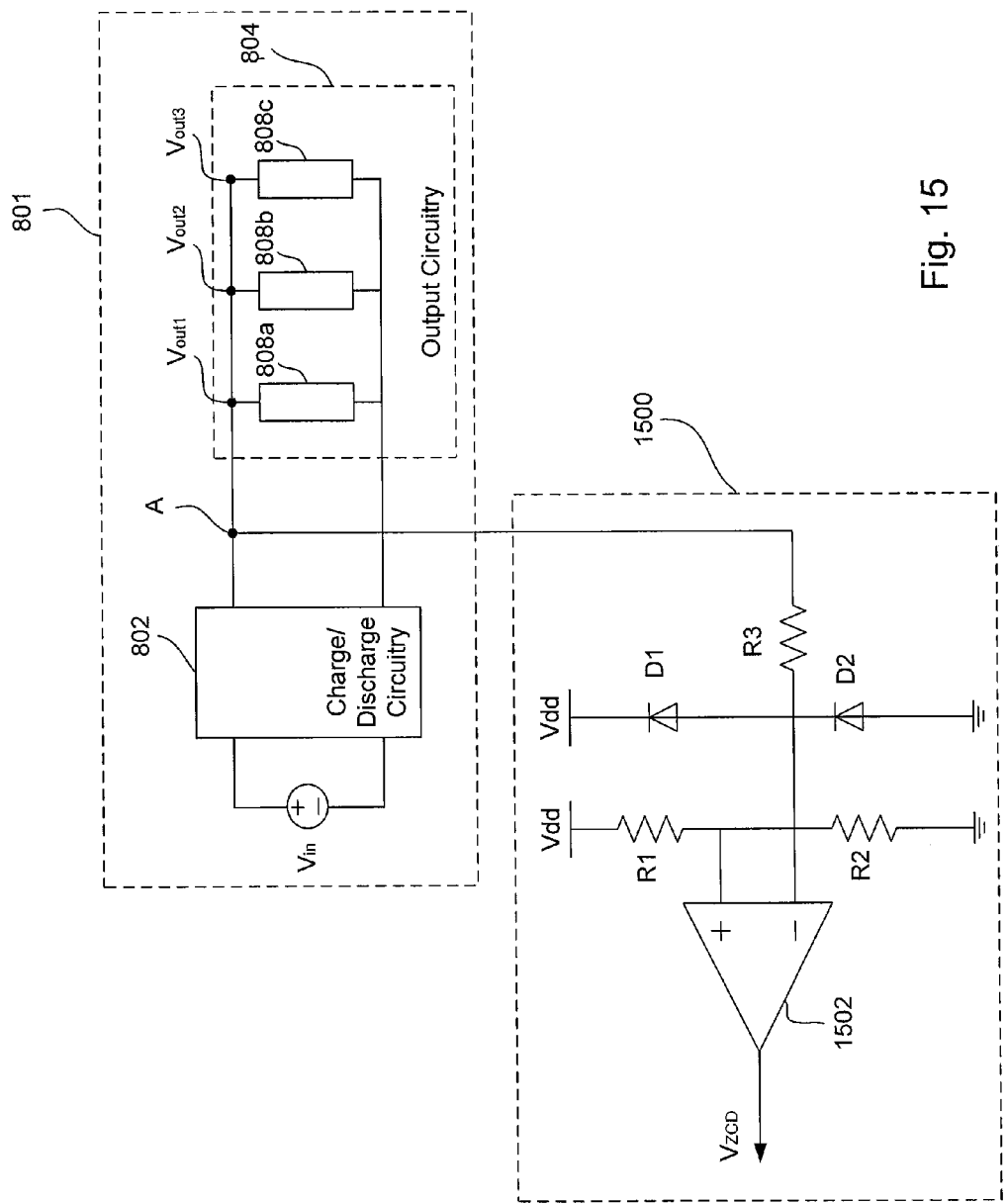
FIG. 15 shows an example zero-cross detection circuit that may be used to measure current being discharged from storage circuitry.
Figure 16:
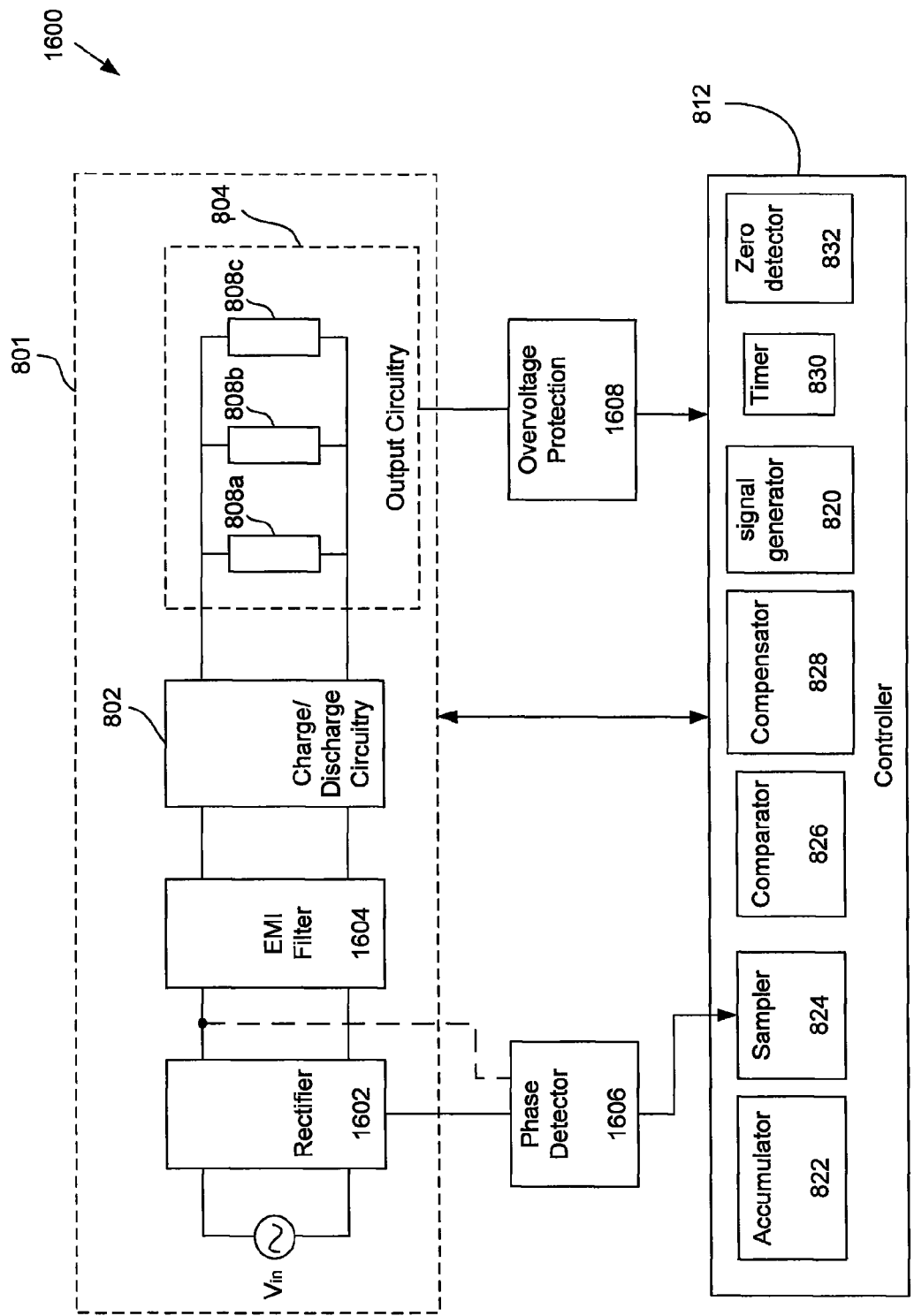
FIG. 16 shows an alternative system comprising the SIMO converter in communication with the controller, and further comprising an electromagnetic interference (EMI) filter, a phase detection module, and an overvoltage protection module.

FIGS. 1-5 show various example SIMO converters that may include a plurality of loads configured to draw current. One or more of the example SIMO converters shown in FIGS. 1-5 may be configured to generate and/or output a light output and may include LEDs configured as loads in the output channels. FIGS. 6A-E and 7A-E show example current (I) versus time (t) diagrams that illustrate various arrangements or sequencing of continuous and discontinuous current conduction through one or more of the example SIMO converters illustrated in FIGS. 1-5. FIG. 8 shows a system that includes an example controller that may be used to control, monitor, and/or measure current conduction through one or more of the example SIMO converters shown in FIGS. 1-5 and/or in accordance with one or more of the current conduction arrangements or sequencing shown in FIGS. 6-7. FIGS. 9-12 show various current (I) versus time (t) diagrams illustrating various switch timing schemes and arrangements of orders in which current may be conducted through the output channels. The timing schemes and/or arrangements of orders may be used and/or implemented with one or more of the arrangements or sequencing of current conduction, such as those shown in FIGS. 6A-6E and/or -7A-7F, and/or may improve the linearity of the SIMO converter. FIG. 13 shows an example integrator that may be used to measure average current flow through the output channels of the SIMO converter. FIGS. 14 and 15 show flow charts of example methods that may be used to control, measure, and/or monitor current conduction through a SIMO converter. FIG. 16 shows an example computer system that may represent the example controller and/or one or more components of the controller.

FIG. 1 shows an example SIMO converter 100. The SIMO converter 100 may include charge/discharge circuitry 102 in communication with output circuitry 104. The charge/discharge circuitry 102 may include storage circuitry 106 that is configured to store and discharge current. The storage circuitry may comprise a single magnetic element or component, such as an inductor or a transformer having primary and secondary windings. The storage circuitry 106 may be configured to receive and/or store current during a charge period of a switching cycle, and discharge at least some of the current during a discharge period of the switching cycle. In some example SIMO converters, the charge period and the discharge period may be non-overlapping periods. When the SIMO converter is charging, the SIMO converter is not also discharging, and vice versa. As a result, the discharge periods may be discontiguous periods, such as discharge periods separated by periods of time where no current or substantially no current is being discharged. In other SIMO converters, the charge period and the discharge period may be overlapping periods. During at least a portion of the charge period, the SIMO converter may also be discharging, and vice versa.

The charge/discharge circuitry 102 may further include main switching circuitry 110. The main switching circuitry 110 may control the charging and discharging of the storage circuitry 106. For example, the main switching circuitry 110 may be configured to switch between an "on" state and an "off" state. When the main switching circuitry 110 is in the "on" state, the storage circuitry 106 may be configured to receive and store the current. When the main switching circuitry is in the "off" state, the storage circuitry 106 may be configured to not receive and/or not store the current, and/or be configured to discharge the current. The main switching circuitry 110 may include one or more switches of various types, such as bipolar junction transistors (BJTs) or field-effect transistors (FETs), as examples. In addition, the main switching circuitry may be configured to turn "on" and "off" by receiving one or more switching signals. The switching signals may comprise one or more characteristics that determine whether the switch is turned "on" or turned "off" and/or for how long the switch is "on" or "off." Example characteristics include waveform, amplitude, frequency, and duty cycle. In one example, the switching signals may comprise pulse-width modulated (PWM) signals having an associated duty cycle. The duty cycle may determine how long the main switching circuitry 110 stays "on" and/or is maintained in the "on" state.

The charge/discharge circuitry 102 may be configured to receive an input signal, such as an input voltage signal. The charge/discharge circuitry 102 may be configured to receive the input signal by being in communication with a source, such as a voltage source $V_{in}$. In some examples, the voltage source $V_{in}$ may be a rectified AC voltage source. For example, the voltage source $V_{in}$ may be an electrical supply from a wall outlet that supplies a 120 V, 60 Hz voltage signal. The voltage source $V_{in}$ may further include or be in communication with a rectifier, such as a four-diode full-bridge rectifier, that communicates a rectified AC signal to the storage circuitry 106. The rectifier may be and/or may be part of power factor correction (PFC) circuitry that supplies the rectified AC signal to the storage circuitry 106. In other examples, the voltage source may be a DC voltage source that communicates a DC signal to the storage circuitry 106. In some examples, the DC source may provide changing, such as unpredictable or desirably changing, DC input signals. Based on receiving the input signal, the storage circuitry 106 may be configured to store the current. The stored charge may be proportional to the input signal, such as being proportional to a magnitude of the input signal.

The charge/discharge circuitry 102 may be further configured to discharge the current stored in the storage circuitry 106 to output circuitry 104. The output circuitry 104 may comprise a plurality of output channels 108a-108n, and the charge/discharge circuitry 106 may be configured to discharge the current into the plurality of output channels 108a-108n. Additionally, the charge/discharge circuitry 106 may be configured to alternatingly discharge the current into the plurality of output channels 108a-108n, such as through time-multiplexing as an example. The plurality of output channels 108a-108n may comprise two or more output channels. The output channels 108a-108n may be connected in parallel with each other. Each of the channels 108a-108n may include an output load Z1-Zn, respectively, from which an output signal $V_{out}$ may be measured. For example, a first channel 108a may include a load Z1, and an output voltage $V_{out1}$ may be measured across Z1, a second channel 108b may include a load Z2, and an output voltage $V_{out2}$ may be measured across Z2, and an nth channel 108n may include a load Zn, and an output voltage $V_{outn}$ may be measured across Zn. The loads may be an electronic device and/or electronic component or plurality of electronic devices and/or electronic components from which an output signal may be obtained and/or that may output an output signal. The loads may be active devices or passive devices. In addition or alternatively, the loads may be configured to conduct current, maintain a substantially constant voltage at an input terminal of the load, and/or function as a current sink. In addition or alternatively, the loads may be configured to generate energy and/or emit heat. Non-limiting examples include one or more solid state light emitters such as light emitting diodes ("LEDs"), cooling systems, zener diodes, linear circuitry, pulse-width-modulated (PWM) converters, resistors, capacitors, inductors, various other type of diodes, or any combination thereof.

The output channels 108a-108n may further include output switches $Q_1$-$Q_n$ connected in series with the loads Z1-Zn, respectively. For example, the load Z1 may be connected in series with the output switch $Q_1$, the load Z2 may be connected in series with the output switch $Q_2$, and the load Zn may be connected in series with the output switch $Q_n$. The output switches $Q_1$-$Q_n$ may be configured to switch between operating in an "on" state and an "off" state. When the output switches $Q_1$-$Q_n$ are in the "on" state, the output channels 108a-108n may be configured to conduct current, provided there is current available from the charge/discharge circuitry 102 to conduct. When the output switches $Q_1$-$Q_n$ are in the "off" state, the output channels 108a-108n may be configured to conduct no current or substantially no current, and/or be configured to prevent current from being conducted through the output channels 108a-108n. Various types of switches may be used for the main switching circuitry 110 and/or the output switches $Q_1$-$Q_n$, such as bipolar junction transistors (BJTs) or field-effect transistors (FETs), as examples.

The output switches $Q_1$-$Q_n$ may be configured to operate cooperatively with the main switching circuitry 110. For some SIMO converters, such as those having overlapping charge and discharge periods in the switching cycle, cooperatively operating may include turning "on" the first of the output switches $Q_1$-$Q_n$ at the same time that the main switching circuitry 110 is turned "on." For other SIMO converters, such as those having non-overlapping charge and discharge periods in the switching cycle, cooperatively operating may include alternatingly turning on the main switching circuitry 110 and at least one of the output switches $Q_1$-$Q_n$. For example, when the main switching circuitry 110 is "on," the output switches $Q_1$-$Q_n$ may be "off." Similarly, when the main switching circuitry 110 is "off," at least one of the output switches $Q_1$-$Q_n$ may be "on." For the SIMO converters having non-overlapping charge and discharge periods in the switching cycles, by cooperatively switching, the storage circuitry 106 may not be discharging current and none of the output switches $Q_1$-$Q_n$ may be drawing current when the storage circuitry 106 is charging. Also, for SIMO converters having non-overlapping charge and discharge periods, by cooperatively switching, the storage circuitry 106 may not be charging while also discharging current into at least one of the channels 108a-108n.

The output channels 108a-108n may each further include capacitors C1-Cn connected in parallel with the loads Z1-Zn, respectively. As current is being discharged from the charge/discharge circuitry 102 and into one of the channels 108a-108n, the current may split between the capacitor C and the load Z. The proportion of the current that passes through the load Z and the proportion of the current that passes through the capacitor C may depend on the voltage across the capacitor C and/or the amount of available current being discharged from the charge/discharge circuitry 102. Where the amount of current being discharged from the charge/discharge circuitry 102 is more than an amount of current that the load Z can handle, then a portion of the current flows into the capacitor C and charges the capacitor C. Alternatively, where the amount of current being discharged from the charge/discharge circuitry 102 is less than the amount of current that the load Z can handle, then all of the current being discharged flows through the load Z. Additionally, where the load Z has capacity to conduct more current than the current being supplied by the charge/discharge circuitry 102, the current stored by the capacitor C may be discharged from the capacitor C and may flow into the load Z.

Other configurations of the channels 108a-108n shown in FIG. 1 are possible. For example the configurations of the switches $Q_1$-$Q_n$ and the parallel combination of the loads Z1-Zn and the capacitors C1-Cn may be reversed in that the current discharged from the storage circuitry 106 may first pass through the switches $Q_1$-$Q_n$ and then pass through the parallel combination of the loads Z1-Zn. Alternatively or in addition, the channels 108a-108n may comprise more, few, or other components other than the switches $Q_1$-$Q_n$, the loads Z1-Zn, and the capacitors C1-Cn, such as diodes and/or resistors, including sense resistors.

Figure 2:
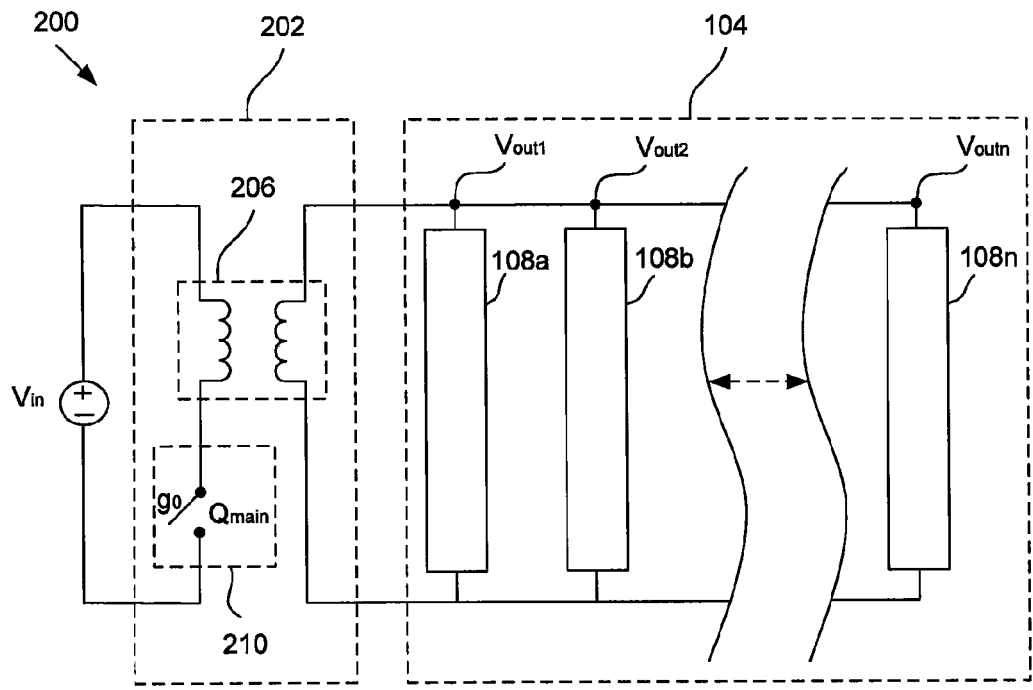
FIG. 2 shows a schematic diagram of an example flyback SIMO converter.
Figure 3:
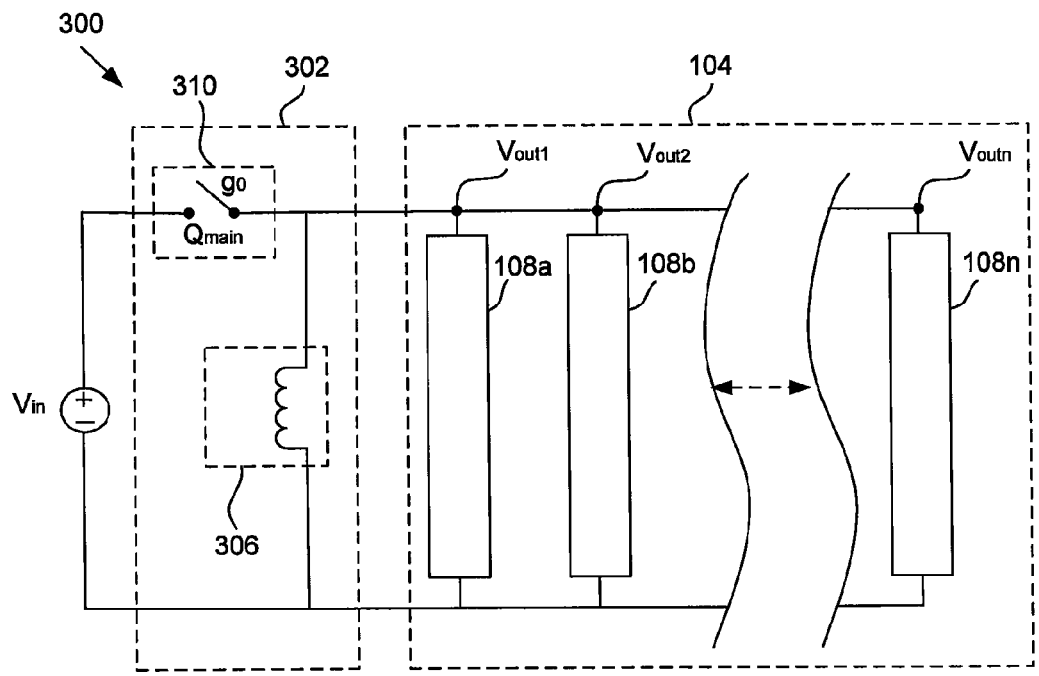
FIG. 3 shows a schematic diagram of an alternative flyback SIMO converter.
Figure 4:
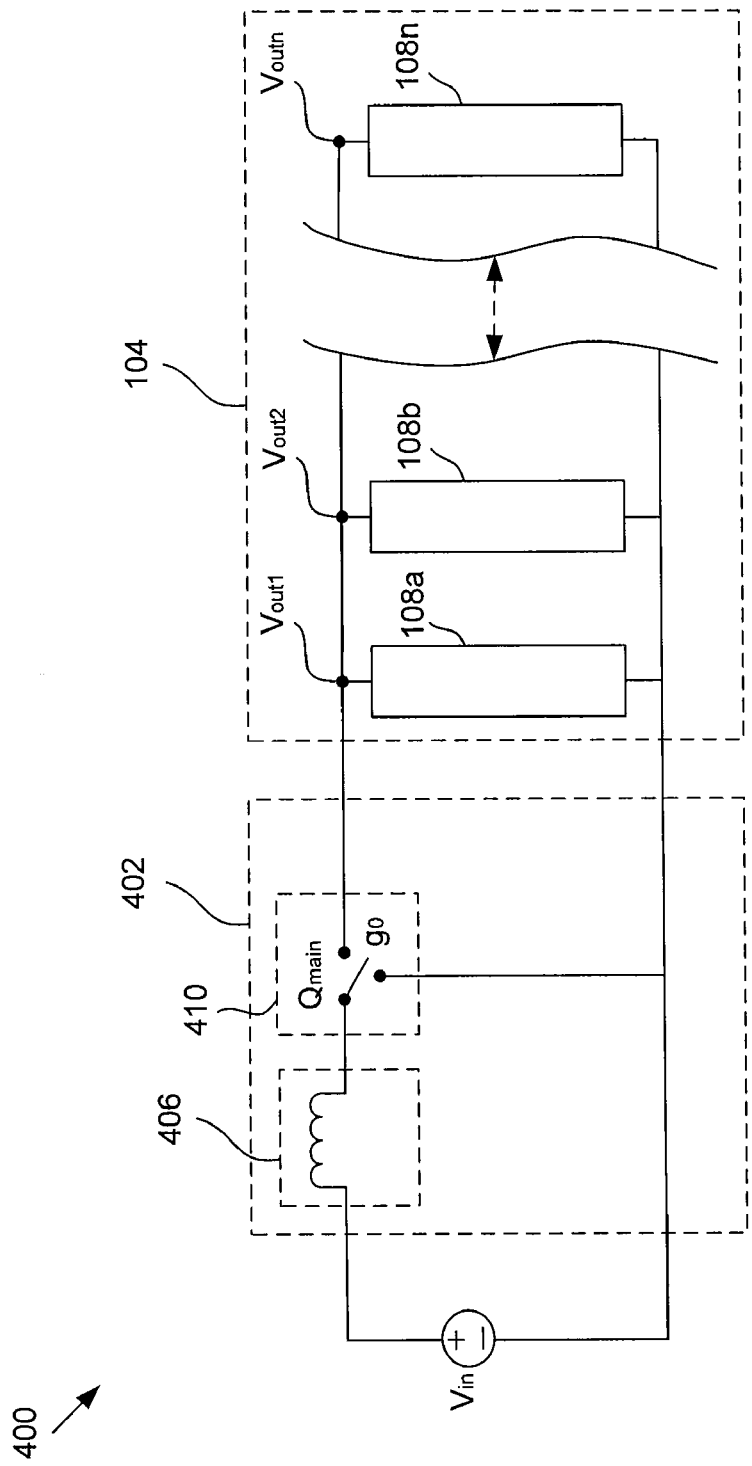
FIG. 4 shows a schematic diagram of an example boost SIMO converter.

Example SIMO converters may be flyback, boost, and buck converters. A difference between the flyback, boost, and/or buck converters may be whether the converter charges and discharges during overlapping periods. The flyback and boost converters may have non-overlapping charge and discharge periods. The buck converter may have overlapping charge and discharge periods. Another and/or related difference between the flyback, boost, and/or buck converters may be in the configuration of the storage circuitry 106 and the main switching circuitry 110 of the charge/discharge circuitry 102. FIGS. 2-4 show various example circuit configurations of the charge/discharge circuitry for the different types of SIMO converters, including the flyback, boost, and buck SIMO converters.

FIG. 2 shows an example circuit configuration of charge/discharge circuitry 202 for a flyback converter 200. Storage circuitry 206 of the charge/discharge circuitry 202 may comprise a transformer having primary and secondary windings and an associated turns ratio. The primary winding may be in communication with the input voltage source $V_{in}$. The secondary windings may be unconnected to the input voltage source $V_{in}$ and in communication with the output circuitry 104, including the output channels 108a-108n. Main switching circuitry 210 may comprise a switch $Q_{main}$ in communication with the primary winding of the transformer 206. The switch $Q_{main}$ may be configured to switch between an "on" state and an "off" state by receiving a switching signal $g_0$. When the main switch $Q_{main}$ is "on," current proportional to the input signal may flow into and be stored in the transformer 206. When the main switch $Q_{main}$ is "off," the secondary winding of the transformer 206 may be configured to discharge the current charge into the plurality of channels 108a-108n.

FIG. 3 shows an alternative example circuit configuration of charge/discharge circuitry 302 for a flyback converter 300. Storage circuitry 306 of the charge/discharge circuitry 302 may comprise a single inductor. Main switching circuitry 310 may include a switch $Q_{main}$ in communication with the single inductor 306. The switch $Q_{main}$ may be configured to switch between an "on" state and an "off" state by receiving a switching signal $g_0$. When the main switch $Q_{main}$ is "on," current proportional to the input signal may flow into and be stored in the single inductor 306. When the main switch $Q_{main}$ is "off," the single inductor 306 may be unconnected from the input voltage source $V_{in}$ and configured to discharge the stored current into the plurality of channels 108a-108n.

FIG. 4 shows an example circuit configuration of charge/discharge circuitry 402 for a boost converter 400. Storage circuitry 406 of the charge/discharge circuitry 402 may comprise a single inductor. Main switching circuitry 410 may include a three-pole switch $Q_{main}$ in communication with the single inductor 406. The switch $Q_{main}$ may be configured to switch between a "charge" state and a "discharge" state by receiving a switching signal $g_0$. When the main switch $Q_{main}$ is in the charging state, the switch $Q_{main}$ is connected to ground and current proportional to the input signal may flow into and be stored in the single inductor 406. When the main switch $Q_{main}$ is in the discharging state, the single inductor 406 remains connected to the input voltage source $V_{in}$, and the input voltage source directly sends the current into the plurality of channels 108a-108n.

Figure 5:
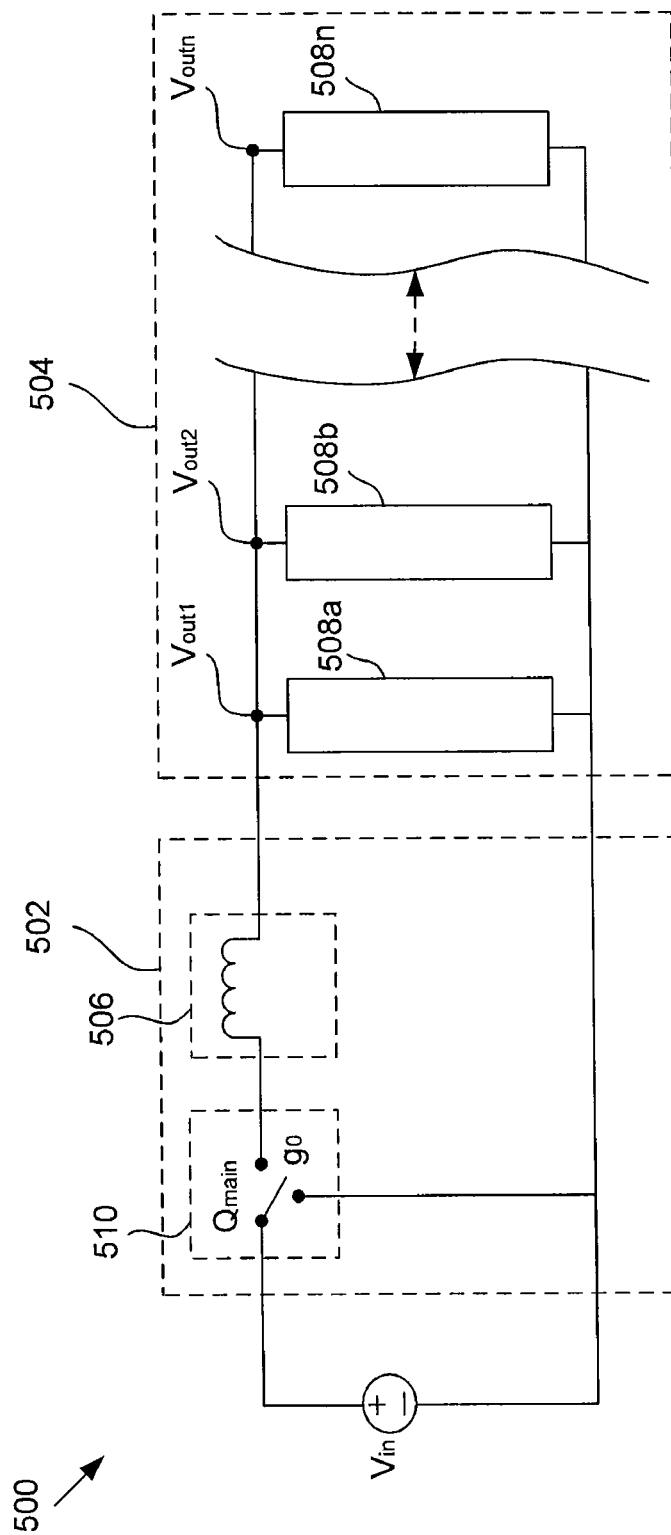
FIG. 5 shows a schematic diagram of an example buck SIMO converter.

FIG. 5 shows an example circuit configuration of charge/discharge circuitry 502 for a buck converter 500. Storage circuitry 506 of the charge/discharge circuitry 502 may comprise a single inductor. Main switching circuitry 510 may include a three-pole switch $Q_{main}$ in communication with the single inductor 506. The switch $Q_{main}$ may be configured to switch between a "charge/discharge" state and a "discharge" state by receiving a switching signal $g_0$. When the main switch $Q_{main}$ is in the charge/discharge state, the switch $Q_{main}$ connects the input voltage source $V_{in}$ with the single inductor 506, and the input voltage source directly sends the current into the plurality of channels 108a-108n. In the charge/discharge state, the current may be stored and discharged at the same time. When the main switch $Q_{main}$ is in the discharging state, the single inductor 506 is unconnected with the input voltage source $V_{in}$ and the current charged in the inductor 506 is charged into the plurality of channels 108a-108n.

The configurations of the charge/discharge circuitry shown in FIGS. 2-5 are exemplary and other configurations, using more or fewer electronic components and/or components other than the components shown in FIGS. 2-5, such as capacitors and/or diodes, may be used in combination with or instead of the switch $Q_{main}$, the transformer, and/or the single inductor for the charge/discharge circuitry.

FIGS. 6A-6F show example current (I) versus time (t) diagrams, illustrating various sequences or arrangements of current conduction in a SIMO converter having non-overlapping charge and discharge periods, such as a flyback or a boost converter. The example arrangements shown in FIGS. 6A-6F are for three output channels (e.g., output channels 108a, 108b, 108c), although they may be applied to other amounts of channels.

Figure 6A:
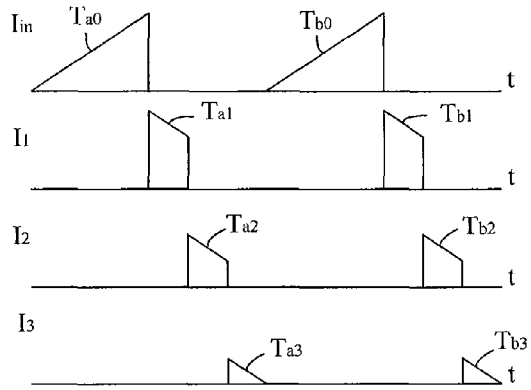
FIG. 6A shows an example current (I) versus time (t) diagram of consolidated sequencing and discontinuous current conduction through a SIMO converter having non-overlapping charge and discharge periods.

FIG. 6A shows an arrangement or sequencing of current conduction in which the channels 108a-108n alternatingly conduct current, each conducting current for a portion of the discharge period. After all (or substantially all) of the current being discharged is conducted through the channels 108a-108n, the main switching circuitry 110 switches "on" and current is stored in the storage circuitry 106. The arrangement or sequencing of current conduction shown in FIG. 6A may be referred to as a consolidated arrangement or sequencing. To illustrate, in a first switching cycle, current is stored in the storage circuitry 106 during a charge period $T_{a0}$, and then current is alternatingly discharged through the channels 108a-108n during discharge periods $T_{a1}$, $T_{a2}$, and $T_{a3}$. After the remaining current is discharged through the last channel 108n over the last discharge period $T_{a3}$, the main switching circuitry 110 is turned "on" and current is charged in the storage circuitry 106 during the next charge period, $T_{b0}$. After the next charge period $T_{b0}$, the current stored in the storage circuitry 106 is alternatingly discharged into the channels 108a-108n over the discharge periods $T_{b1}$, $T_{b2}$, and $T_{b3}$. For the consolidated sequencing or arrangement, a switching order in which the channels 108a-108n alternatingly conduct current in the discharge period may be determined. For example, as shown in FIG. 6A, the order comprises the first channel 108a conducting current, then the second channel 108b conducting current, and then the third channel 108c conducting current. After the channels have cycled through the order, the same order may be repeated for one or more subsequent switching cycles. Alternatively, a different order may be determined for one or more subsequent switching cycles.

Figure 6B:
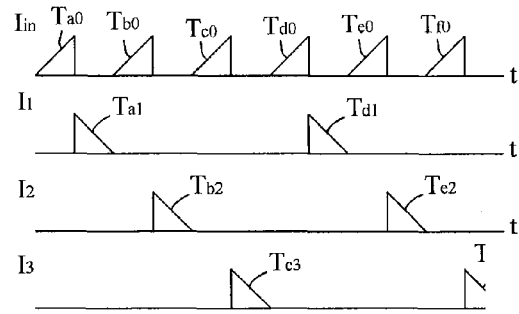
FIG. 6B shows an example current (I) versus time (t) diagram of discontinuous current conduction and interleaved sequencing through a SIMO converter having non-overlapping charge and discharge periods.

FIG. 6B shows an alternative arrangement sequencing of current conduction in which each output channel 108a-108n conducts current over an entire discharge period, and the output channels 108a-108n alternatingly conduct current. The arrangement or sequencing shown in FIG. 6B may be referred to as an interleaved arrangement of discontinuous current conduction. To illustrate, for a first switching cycle, current is stored during a first charge period $T_{a0}$. Subsequently, current is discharged into the first channel 108a during a first discharge period $T_{a1}$. After all (or substantially all) of the current stored during the first discharge period $T_{a1}$ is discharged, further current is stored during a second charge period $T_{b0}$. Subsequently, the current is discharged into the second channel 108b during a second discharge period $T_{b2}$. After all (or substantially all) of the current is discharged during the second discharge period $T_{b2}$, further current is stored during a third charge period $T_{c0}$. Subsequently, current is discharged into the third channel 108c during a third discharge period $T_{c3}$. For the discontinuous interleaved arrangement, a switching order in which the channels 108a-108n alternatingly conduct current over a plurality of discharge periods may be determined. For example, as shown in FIG. 6B, the order comprises the first channel 108a conducting current, then the second channel 108b conducting current, and then the third channel 108c conducting current. After the channels have cycled through the order, the same order may be repeated for one or more subsequent switching cycles. Alternatively, a different order may be determined for one or more subsequent switching cycles.

Figure 6C:
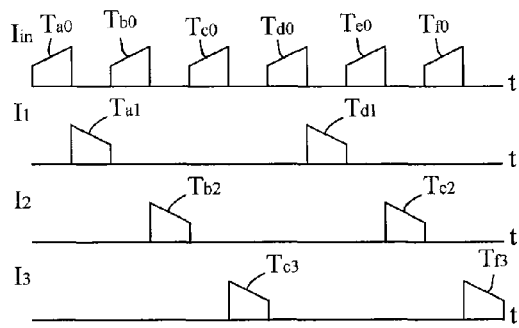
FIG. 6C shows an example current (I) versus time (t) diagram of continuous current conduction and interleaved sequencing through a SIMO converter having non-overlapping charge and discharge periods.

FIG. 6C shows another alternative arrangement or sequencing of current conduction in which each output channel 108a-108n conducts current over an entire discharge period, and the output channels 108a-108n alternatingly conduct current. The arrangement or sequencing shown in FIG. 6C may be referred to as an interleaved arrangement of continuous current conduction. The interleaved arrangement of continuous current conduction shown in FIG. 6C is similar to the interleaved arrangement of discontinuous current conduction shown in FIG. 6B, except that for the continuous interleaved arrangement, the entire discharge period is not a long enough time period for all of the current stored in the storage circuitry 106 to be discharged by one of the output channels 108a-108n. The next charge period begins before all of the current stored in the storage circuitry 106 is discharged through one or more of the output channels 108a-108n. For example, the first discharge period $T_{a1}$ ends and the next charge period $T_{b0}$ starts before all (or substantially all) of the current stored in the storage circuitry 106 is discharged.

Figure 6D:
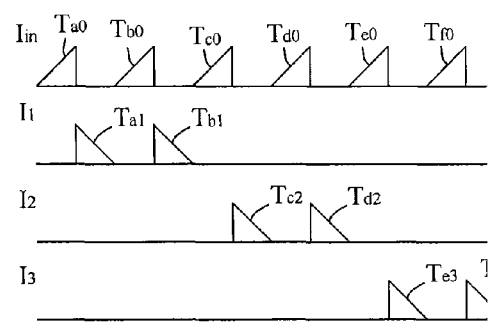
FIG. 6D shows an example current (I) versus time (t) diagram of discontinuous current conduction and commutated sequencing through a SIMO converter having non-overlapping charge and discharge periods.

FIG. 6D shows another alternative arrangement or sequencing of current conduction in which each output channel 108a-108n conducts current over an entire discharge period, and the output channels 108a-108n may not alternatingly conduct current. The arrangement or sequencing shown in FIG. 6D may be referred to as a commutated arrangement or sequencing. For the commutated arrangement or sequencing, a switching order in which the channels 108a-108n conduct current may be determined. In one example, as shown in FIG. 6D, the order may include one of the channels 108a-108n conducting current over two or more consecutive discharge periods. To illustrate, the first channel 108a conducts current over consecutive discharge periods $T_{a1}$ and $T_{b1}$, then the second channel 108b conducts current over consecutive discharge periods $T_{c2}$ and $T_{d2}$, and then the third channel 108c conducts current over consecutive discharge periods $T_{e3}$ and $T_{f3}$. In subsequent switching cycles, the order may be repeated, or a different order may be determined.

Figure 6E:
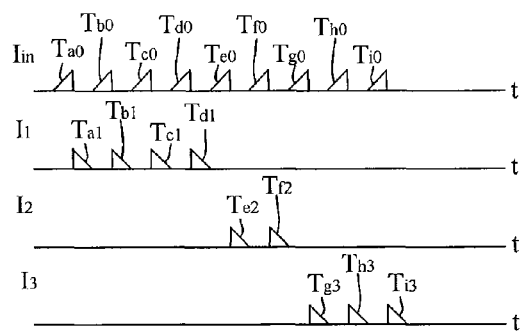
FIG. 6E shows an example current (I) versus time (t) diagram of discontinuous current conduction and an alternative commutated sequencing through a SIMO converter having non-overlapping charge and discharge periods.

FIG. 6E shows another alternative arrangement or sequencing of current conduction in which each output channel 108a-108n conducts current over an entire discharge period, and the output channels 108a-108n may not alternatingly conduct current. The arrangement shown in FIG. 6E may be referred to as a commutated arrangement, which may be similar to the commutated arrangement shown in FIG. 6D, except that in the order, two or more of the numbers of consecutive discharge periods among the channels 108a-108n may be unequal. To illustrate, as shown in FIG. 6E, the first channel 108a conducts current over four consecutive discharge periods $T_{a1}$, $T_{b1}$, $T_{c1}$, $T_{d1}$; the second channel 108b conducts current over two consecutive discharge periods $T_{e2}$, $T_{f2}$; and the third channel 108c conducts current over three consecutive discharge periods $T_{g3}$, $T_{h3}$, $T_{i3}$. In subsequent switching cycles, the order may be repeated, or a different order may be determined.

The arrangements or sequences of current conduction shown in FIGS. 6A-6E are exemplary and may be implemented independently or in combination with one another, including various combinations of continuous and discontinuous current conduction and consolidated, interleaved, and commutated sequencing. In addition or alternatively, the arrangements or sequences may be determined for varying conduction periods, which as described in more detail below, and/or may be dependent upon a time varying input signal. Other arrangements or sequences of current conduction through a SIMO converter, such as continuous current conduction with consolidated switching, continuous current conduction with commutated switching, or combination thereof, may be possible.

FIGS. 7A-7F show example current (I) versus time (t) diagrams, illustrating various sequences or arrangements of current conduction in a SIMO converter having overlapping charge and discharge periods, such as a buck converter. The example arrangements shown in FIGS. 7A-7F are for three output channels (e.g., output channels 108a, 108b, 108c), although they may be applied to other amounts of channels.

FIG. 7A shows an arrangement or sequencing of discontinuous current conduction in which the channels 108a-108n alternatingly conduct current, each conducting current for a portion of the discharge period. In addition, current may be stored during at least a portion of the discharge period that current is being discharged through the channels 108a-108n. After all (or substantially all) of the current being discharged is conducted through the channels 108a-108n, the main switching circuitry 110 switches "on" and current is stored in the storage circuitry 106. One or more of the channels 108a-108n may conduct current when the main switching circuitry 110 switch "on." The arrangement or sequencing of current conduction shown in FIG. 7A may be referred to as a consolidated arrangement or sequencing of discontinous current conduction. To illustrate, in a first switching cycle, current is stored in the storage circuitry 106 during a charge period $T_{a0}$. During the charge period $T_{a0}$, current is also being discharged through the first channel 108a during a first discharge period $T_{a1}$ and then through the second channel 108b during a portion of the second discharge period $T_{a2}$. At some point during the second discharge period $T_{a2}$, the main switching circuitry 110 may switch "off" and current is being discharged during discharge periods without current also being stored during charge periods. At the end of the second discharge period $T_{a2}$, the remainder of the current is discharged in the last channel 108n during the third discharge period $T_{a3}$. After the remaining current is discharged through the last channel 108n over the last discharge period $T_{a3}$, the main switching circuitry 110 is turned "on" and current is charged in the storage circuitry 106 during the charge period $T_{b0}$ of the next switching cycle. In addition, during the next switching cycle and overlapping with the charge period $T_{b0}$, current is being discharged through the first channel 108a during a first discharge period $T_{b1}$ and then through the second channel 108b during a portion of the second discharge period $T_{b2}$. At some point during the second discharge period $T_{b2}$, the main switching circuitry 110 may switch "off" and current is being discharged during discharge periods without current also being stored during charge periods. At the end of the second discharge period $T_{b2}$, the remainder of the current is discharged in the last channel 108n during the third discharge period $T_{b3}$ of the next switching cycle. For the consolidated switching arrangement or sequencing, a switching order in which the channels 108a-108n alternatingly conduct current in the discharge period may be determined. For example, as shown in FIG. 7A, the order comprises the first channel 108a conducting current, then the second channel 108b conducting current, and then the third channel 108c conducting current. After the channels have cycled through the order, the same order may be repeated for one or more subsequent switching cycles. Alternatively, a different order may be determined for one or more subsequent switching cycles.

FIG. 7B shows an alternative arrangement or sequencing of current conduction in which each output channel 108a-108n conducts current over an entire discharge period, and the output channels 108a-108n alternatingly conduct current. In addition, current may be stored during at least a portion of a discharge period that current is being discharged through one of the channels 108a-108n. The arrangement or sequencing shown in FIG. 7B may be referred to as an interleaved arrangement or sequencing of discontinuous current conduction. To illustrate, for a first switching cycle, current is stored during a first charge period $T_{a0}$. In addition, during the first charge period $T_{a0}$, current is being discharged through the first channel 108a during an overlapping first discharge period $T_{a1}$. At some point during the first discharge period $T_{a1}$, the first charge period $T_{a0}$ ends and current is being discharged through the first channel 108a without current being also being stored. After all (or substantially all) of the current is discharged, the main switching circuitry 110 is turned "on" and current is stored during a second charge period $T_{b0}$. Concurrently, current is being discharged during a second discharge period $T_{b2}$. At some point during the second discharge period $T_{b2}$, the second charge period $T_{b0}$ ends and current is being discharged through the second channel 108b without current being also being stored. After all (or substantially all) of the current is discharged, current is stored during a third charge period $T_{c0}$. Concurrently, current is being discharged during a second discharge period $T_{c3}$. For the interleaved arrangement or sequencing of discontinuous current conduction, a switching order in which the channels 108a-108n alternatingly conduct current over a plurality of discharge periods may be determined. For example, as shown in FIG. 7B, the order comprises the first channel 108a conducting current, then the second channel 108b conducting current, and then the third channel 108c conducting current. After the channels have cycled through the order, the same order may be repeated for one or more subsequent switching cycles. For example, the first channel 108a may conduct current during a fourth discharge period $T_{d1}$, then the second channel 108b may conduct current during a fifth discharge period $T_{e2}$, and then the third channel 108c may conduct current during a sixth discharge period $T_{f3}$. Alternatively, a different order may be determined for one or more subsequent switching cycles.

FIG. 7C shows another alternative arrangement or sequencing of current conduction in which each output channel 108a-108n conducts current over an entire discharge period, and the output channels 108a-108n alternatingly conduct current. In addition, current may be stored during at least a portion of a discharge period that current is being discharged through one of the channels 108a-108n. The arrangement or sequencing shown in FIG. 7C may be referred to as an interleaved arrangement of continuous current conduction. The continuous interleaved arrangement shown in FIG. 7C is similar to the discontinuous interleaved arrangement shown in FIG. 7B, except that for the continuous interleaved arrangement, the entire discharge period is not a long enough time period for all of the current to be discharged by one of the output channels 108a-108n. The next charge period begins before all of the current is discharged through one or more of the output channels 108a-108n. For example, the first discharge period $T_{a1}$ ends and the next charge period $T_{b0}$ starts before all (or substantially all) of the current is discharged through the first channel 108a. Additionally, when the next charge period $T_{b0}$ beings, a next discharge period $T_{b1}$ also begins. At some point during the next discharge period $T_{b1}$, the next charge period $T_{b0}$ ends and current is discharged through the second channel 108b without current also being stored.

FIG. 7D shows another alternative arrangement or sequencing of current conduction in which each output channel 108a-108n conducts current over an entire discharge period, and the output channels 108a-108n may not alternatingly conduct current. In addition, current may be stored during at least a portion of a discharge period that current is being discharged through one of the channels 108a-108n. The arrangement or sequencing shown in FIG. 7D may be referred to as a commutated arrangement or sequencing. For the commutated arrangement, a switching order in which the channels $108a$-$108n$ conduct current may be determined. In one example, as shown in FIG. 7D, the order may include one of the channels $108a$-$108n$ conducting current over two or more consecutive discharge periods. To illustrate, the first channel $108a$ conducts current over consecutive discharge periods $T_{a1}$ and $T_{b1}$, then the second channel $108b$ conducts current over consecutive discharge periods $T_{c2}$ and $T_{d2}$, and then the third channel $108c$ conducts current over consecutive discharge periods $T_{e3}$ and $T_{f3}$. In subsequent switching cycles, the order may be repeated, or a different order may be determined. In addition, during the switching cycles, current may be discharged during the discharge period through one of the channels $108a$-$108n$ while current is also being stored. At some point during the discharge period, the charge period ends, and current is being discharged through one of the channels without current also being stored, as previously described.

FIG. 7E shows another alternative arrangement or sequencing of current conduction in which each output channel $108a$-$108n$ conducts current over an entire discharge period, and the output channels $108a$-$108n$ may not alternatingly conduct current. The arrangement shown in FIG. 7E may be referred to as a commutated arrangement or sequencing, which may be similar to the commutated arrangement shown in FIG. 7D, except that in the order, two or more of the numbers of consecutive discharge periods among the channels $108a$-$108n$ may be unequal. To illustrate, as shown in FIG. 7E, the first channel $108a$ conducts current over four consecutive discharge periods $T_{a1}$, $T_{b1}$, $T_{c1}$, $T_{d1}$; the second channel $108b$ conducts current over two consecutive discharge periods $T_{e2}$, $T_{f2}$; and the third channel $108c$ conducts current over three consecutive discharge periods $T_{g3}$, $T_{h3}$, $T_{i3}$. In subsequent switching cycles, the order may be repeated, or a different order may be determined. In addition, during the switching cycles, current may be discharged during the discharge period through one of the channels $108a$-$108n$ while current is also being stored. At some point during the discharge period, the charge period ends, and current is being discharged through one of the channels without current also being stored, as previously described.

The arrangements or sequences of current conduction shown in FIGS. 7A-7E are exemplary and may be implemented independently or in combination with one another, including various combinations of continuous and discontinuous current conduction and consolidated, interleaved, and commutated sequencing. In addition or alternatively, the arrangements or sequences may be determined for varying conduction periods, which as described in more detail below, and/or may be dependent upon a time varying input signal. Other arrangements or sequences of current conduction through a SIMO converter, such as continuous current conduction with consolidated switching, continuous current conduction with commutated switching, or combination thereof, may be possible.

The above example SIMO converters 100, 200, 300, 400, 500 may be controlled to store and/or conduct current in accordance with arrangements or sequencing of current conduction, such as those illustrated in FIGS. 6A-6E and/or 7A-7E using one or more controllers. FIG. 8 shows an example system 800 that includes an example SIMO converter 801, such as one of the SIMO converters 100, 200, 300, 400, 500 shown in FIGS. 1-5, in communication with a controller 812. The controller 812 may communicate with the SIMO converter 801 to control, measure, and/or monitor the flow of current through the SIMO converter 801. The SIMO converter 801 may include charge/discharge circuitry 802 having storage circuitry 806 and main switching circuitry 810 that is configured to receive an input signal $V_{in}$ and is further configured to store current and discharge the current into a plurality of output channels 808a-808c, as previously described. The example SIMO converter 801 shown in FIG. 8 comprises three channels 808a, 808b, and 808c, although two or more output channels may be used. Each of the channels 808a, 808b, 808c may include an output load Z1, Z2, Z3, respectively, from which an output signal $V_{out}$ may be emitted and/or measured. Each of the channels 808a-808c may further include output switches $Q_1$, $Q_2$, and $Q_3$ connected in series with the respective loads Z1, Z2, and Z3, and capacitors C1, C2, and C3 connected in parallel with the respective loads Z1, Z2, and Z3. Each of the channels 508a-508c may be configured to conduct current that is discharged from the charge/discharge circuitry 506 when their respective output switches $Q_1$-$Q_3$ are configured in an "on" state, as previously described.

The controller 812 may be configured to communicate with the SIMO converter 801 to control and/or monitor the charging and discharging of the current through the SIMO converter 801. The controller 812 may be configured to perform output channel control and/or string control, which controls the control of current through the multiple output channels or output strings of the SIMO converter 801. For example, the controller 812 may be configured to turn each of the main switching circuitry 810 and the output switches $Q_1$, $Q_2$, and $Q_3$ "on" and "off" and/or maintain the main switching circuitry 810 and/or the output switches $Q_1$, $Q_2$, and $Q_3$ in "on" and/or "off" states. The controller 812 may be configured to turn the main switching circuitry 810 and the output switches $Q_1$, $Q_2$, and $Q_3$ "on" and "off" and/or maintain the main switching circuitry 810 and/or the output switches $Q_1$, $Q_2$, and $Q_3$ in "on" and "off" states by sending switching signals $g_0$, $g_1$, $g_2$, $g_3$ to the main switching circuitry 810 and the output switches $Q_1$, $Q_2$, and $Q_3$, respectively.

The controller 812 may be configured to have one or more outputs that send one or more output signals, such as switching signals, to control the charging and discharging of the current through the SIMO converter 801. In some examples, the controller 812 may be configured to have a feedback loop that receives and/or measures one or more outputs of the SIMO converter 801, such as output voltages across and/or output currents through the output channels 808a-808c and/or one or more components of the output channels 808a-808c. The controller 812 may be configured to feed the outputs back through the feedback loop to an input, and based on the received and/or measured one or more outputs, the controller 812 may determine whether and/or how much to adjust the output signals sent to the SIMO converter 801. In some examples, the controller 812 may be configured to translate voltage and/or current measurements to time-based measurements that are used to set and/or adjust one or more time parameters of the output signals sent to the SIMO converter 801. For example, where the output signals are PWM signals, the received and/or measured output from the SIMO converter 801 may be used by the controller 812 to adjust and/or set frequency and/or duty cycle parameters of the PWM signals. In some examples, the feedback loop may be based on single-in-single-out (SISO) control properties, and/or the number of feedback loops corresponds to the number of main switches 810 and output switches $Q_1$, $Q_2$, $Q_3$. Additionally, the number of outputs of the controller 812 may correspond to a total number of switches, including a switch in the main switching circuitry 810 and the output switches $Q_1$, $Q_2$, $Q_3$.

The controller 812 may include a signal generator 820 that is configured to generate the switching signals $g_0$, $g_1$, $g_2$, $g_3$ and/or send the switching signals $g_0$, $g_1$, $g_2$, $g_3$ to the main switching circuitry 810 and/or the output switches $Q_1$, $Q_2$, $Q_3$ to turn the main output circuitry 810 and/or the output switches $Q_1$, $Q_2$, $Q_3$ "on" and "off." In some examples, where the output switches $Q_1$, $Q_2$, $Q_3$ comprise field effect transistors (FETs) the signal generator 820 may comprise dual low-side gate drivers used to drive the gates of the FETs. The signal generator 820 may be configured to determine a type of switching signal and generate the type of switching signal. In one example, the type of one or more of the switching signals $g_0$, $g_1$, $g_2$, $g_3$ may comprise pulse-width modulated (PWM) switching signals having an associated duty cycle. The signal generator 820 may comprise a PWM signal generator that is configured to generate the PWM switching signals. The duty cycle may determine how long the main switching circuitry 810 and/or the output switches $Q_1$, $Q_2$, and $Q_3$ may stay "on" and/or are maintained in their "on" or "off" states. Other types of switching signals may be generated.

The signal generator 820 may further be configured to determine when to send the switching signals $g_0$, $g_1$, $g_2$, $g_3$ to the main switching circuitry 810 and the output switches $Q_1$, $Q_2$, $Q_3$. The signal generator 820 may also be configured to determine the duty cycles of the switching signals $g_0$, $g_1$, $g_2$, $g_3$. To determine when to send the switching signals $g_0$, $g_1$, $g_2$, $g_3$ and/or the duty cycles of the switching signals $g_0$, $g_1$, $g_2$, $g_3$, the signal generator 820 may determine when to turn the main switching circuitry 810 and/or the output switches $Q_1$, $Q_2$, and $Q_3$ "on" and "off" and/or how long to maintain the main switching circuitry 810 and/or the output switches $Q_1$, $Q_2$, and $Q_3$ in "on" and "off" states.

To determine when to turn the main switching circuitry 810 and/or the output switches $Q_1$, $Q_2$, and $Q_3$ "on" and "off" and/or how long to maintain the main switching circuitry 810 and/or the output switches $Q_1$, $Q_2$, and $Q_3$ in "on" and "off" states, the signal generator 820 may be configured to determine one or more timing parameters, including charge periods, channel conduction periods, discharge periods, start times, stop times, ratios between channel conduction periods, and/or other timing parameters. The charge period and the channel conduction periods may be time periods or time durations that the main switching circuitry 810 and/or the output switches $Q_1$, $Q_2$, and $Q_3$ are in the "on" state. The start time may be an operation time at which the main switching circuitry 810 and/or the output switches $Q_1$, $Q_2$, $Q_3$ turn "on," and the stop time may be a time at which the main switching circuitry 810 and/or the output switches $Q_1$, $Q_2$, and $Q_3$ turn "off." The ratios between channel conduction periods may be a ratio between two or more channel conduction periods of channels within the same switching cycle, of the same channel between two or more switching cycles, and/or of a channel and a total channel conduction period of all of the output channels, as described in more detail below. The signal generator 820 may be configured to use one or more of the timing parameters within one or more arrangements, sequences, schemes, or timing relationships between the main switching circuitry 810 and the output switches $Q_1$, $Q_2$, $Q_3$ and/or between the output switches $Q_1$, $Q_2$, $Q_3$, as described in further detail below. Based on determining the timing parameters and the arrangements, sequences, schemes, and/or relationships, the signal generator 820 may determine when and for how long to switch the main switching circuitry 810 and/or the output switches $Q_1$, $Q_2$, and $Q_3$ "on" and "off." Based on determining when and for how long to switch the main switching circuitry 810 and/or output switches $Q_1$, $Q_2$, and $Q_3$ "on" and "off," the signal generator 820 may determine the duty cycles of the switching signals $g_0$, $g_1$, $g_2$, $g_3$ and/or when to send the switching signals $g_0$, $g_1$, $g_2$, $g_3$.

In some examples, where the signal generator 820 is configured to generate PWM switching signals as the switching signals $g_0$, $g_1$, $g_2$, $g_3$, the signal generator 820 may comprise a counting module 840 that includes one or more counters, such as one or more up-counters, down-counters, up-down counters, or a combination thereof. The up-counter may count up from a minimum value to a maximum value and then reset when the maximum value is reached. The down-counter may count down from a maximum value to a minimum value and then reset when the minimum value is reached. The up-down counter may count up to a maximum value and then count down to a minimum value and then count back up to the maximum value, and so on. The signal generator 820 may comprise a counter that is used to generate the PWM switching signal $g_0$ that controls switching of the main switching circuitry 810, and another counter that is used to generate the PWM switching signals $g_1$, $g_2$, $g_3$ that control switching of the output switches $Q_1$, $Q_2$, $Q_3$. Other counter configurations are possible. The signal generator 820 may have an associated resolution at which to determine and/or set the duty cycles of the PWM switching signals $g_0$, $g_1$, $g_2$, $g_3$. The resolution may be represented by a PWM step count and may be determined by a system clock frequency and a switching frequency. To illustrate, a system clock may operate at 20 MHz. If, for example, the switching frequency of the PWM switching signals is 100 kHz, then a 200 PWM step count (i.e., 20 MHz divided by 100 kHz) results, which may be used to generate the PWM switching signal. For a PWM switching signal having a 50% duty cycle, half (i.e., 100) of the PWM step counts is "on" and half of the PWM step counts is "off."

The resolution may also be represented by a PWM step size, which may be denoted as a time increment, $T_{step}$, and may represent an amount of time in which the pulse-width may be adjusted. The PWM step size may also be an inverse of the system clock. The time increment, $T_{step}$, may be calculated as follows:

$$T_{Step} = \frac{T_{Switch}}{2^n},$$

where $T_{Switch}$ is the switching time period (i.e., the inverse of the switching frequency), and n is a number of bits of resolution. In one example, where the switching time period $T_{Switch}$ is 10 µs and the number of bits of resolution is 10, the PWM step size is 9.77 ns (approximately 10 ns). Accordingly, the pulse width of the PWM signal may be adjusted in approximately 10 ns increments.

In the example above, a switching frequency of 100 kHz was used. Other switching frequencies are possible, and in one example, the switching frequency may be in a range having a lower bound of approximately 50 kHz and an upper bound of approximately 150 kHz. In some examples, electromagnetic interference (EMI) scanning and testing may determine and/or affect the upper bound the switching frequency that may be used. In addition or alternatively, electronic component cost and/or physical size may determine and/or affect the switching frequency.

The signal generator 820 may use the counters to generate the PWM switching signals in accordance with the PWM step counts. To illustrate using up-down counters, the up-down counters may count up to the PWM step count value determined by the system clock frequency and the switching frequency. Using the example above for the step count of 200, the up-down counters may count up from 0 to 100, and then count back down from 100 to 0. For each step count, the signal generator 820 may determine whether to set a sample or portion of the PWM switching signal corresponding to the step count high (e.g., "on") or low (e.g., "low"). The signal generator 820 may further be configured to use one or more compare values to determine whether to set a sample or portion of the PWM switching signal corresponding to the step count high or low. In one example, the signal generator 820 may be configured to compare the step count with a first compare value. For a given step count, if the first compare value is greater than the step count, then the signal generator 820 may be configured to set the portion of the PWM switching corresponding to the step count low. On the other hand, if the first compare value is greater than or equal to the step count, then the signal generator 820 may be configured to set the portion of the PWM switching signal corresponding to the step count high. Reverse configuration may also be possible. Further, the signal generator 820 may be configured to compare the step count with a second compare value. Similarly, for a given step count, if the second compare value is greater than the step count, then the signal generator 820 may be configured to set the portion of the PWM switching signal corresponding to the step count low, and if the second compare value is greater than or equal to the step count, then the signal generator 820 may be configured to set the portion of the PWM switching signal corresponding to the step count high, or vice versa. Some of the PWM switching signals $g_0$, $g_1$, $g_2$, $g_3$ may be generated by comparing the step count with only one of the first and second compare values, and other of the PWM switching signals $g_0$, $g_1$, $g_2$, $g_3$ may be generated by comparing the step count with both of the first and the second compare values. In addition, the compare values used for one of the output channels 808a-808c may be independent of the compare values used for one or more of the other output channels 808a-808c. In addition or alternatively, the compare values used for the main switching circuitry 810 may be independent of the compare values used for one or more of the output channels 808a-808c. To illustrate, the signal generator 820 may use a first set of first and second compare values to generate the PWM switching signal $g_o$ that is output to the main switching circuitry 810, and a second set of first and second compare values to generate the PWM switching signals $g_1$, $g_2$, $g_3$ that are output to the output switches Q1, Q2, and Q3. In addition, the signal generator 820 may use both the first and second compare values in the first set to generate the switching signal $g_0$. Also, the signal generator 820 may use both the first and second compare values in the second set to generate switching signals that are sent to non-first or non-last output channels (e.g., the second output PWM switching signal $g_2$ that is sent to the second $Q_2$). Also, the signal generator 820 may use only one of the compare values in the second set (e.g., the first compare value or the second compare value) to generate the output PWM switching signals sent to the first and last switches (e.g., the first output PWM switching signal $g_1$ that is sent to the first output switch $Q_1$ and the third output PWM switching signal $g_3$ that is sent to the third output switch $Q_3$). In some examples, the compare value used to generate the first output PWM switching signal $g_1$ may be different than the compare value used to generate the last output PWM switching signal $g_3$. For example, the first compare value in the second set may be used to generate the first output PWM switching signal $g_1$ and the second compare value in the second set may be used to generate the third output PWM switching signal $g_3$. Various other configurations are possible.

The signal generator 820 may also be configured to determine an offset between the up-down counter used to generate the PWM output switching signal $g_0$ that is sent to the main switching circuitry 810 and the up-down counter used to generate the PWM output switching signals $g_1$, $g_2$, $g_3$ that are sent to the output switches $Q_1$, $Q_2$, $Q_3$. The determined offset is described in further detail below.

In addition or alternatively, the signal generator 820 may be configured to determine one or more arrangements or sequences of current conduction, including consolidated, interleaved, and/or commutated arrangements or sequences of current conduction, as described above with reference to FIGS. 6A-6E, 7A-7E. In addition or alternatively, the determination may include determining a switching or timing relationship between the main switching circuitry 810 and one or more of the output switches $Q_1$, $Q_2$, $Q_3$. In one example, the signal generator controller 820 may be configured to alternatingly turn the main circuitry 810 and at least one of the output switches $Q_1$, $Q_2$, and $Q_3$ "on" and "off" and/or alternatingly maintain the main circuitry 810 and at least one of the output switches $Q_1$, $Q_2$, and $Q_3$ in "on" and "off" states. The signal generator controller 820 may be configured to alternatingly turn the main circuitry 810 and at least one of the output switches $Q_1$, $Q_2$, and $Q_3$ "on" and "off" and/or alternatingly maintain the main circuitry 810 and at least one of the output switches $Q_1$, $Q_2$, and $Q_3$ in "on" and "off" states so that the SIMO converter 801 has non-overlapping charge and discharge periods. When the signal generator 820 turns the main switching circuitry 810 "on," the signal generator 820 may be configured to turn the output switches $Q_1$, $Q_2$, and $Q_3$ "off" and/or maintain the output switches $Q_1$, $Q_2$, and $Q_3$ in "off" states. In addition, when the signal generator 820 turns the main switching circuitry 810 "off," the signal generator 820 may be configured to turn at least one of the output switches $Q_1$, $Q_2$, and $Q_3$ "on" and/or maintain the output switches $Q_1$, $Q_2$, and $Q_3$ in an "on" state.

In an alternative example, the signal generator 820 may be configured to turn the main switching circuitry 810 "on" and one or more of the output switches $Q_1$, $Q_2$, and $Q_3$ "on" concurrently and/or maintain the main switching circuitry 810 and one or more of the output switches $Q_1$, $Q_2$, and $Q_3$ in "on" states concurrently. The signal generator 820 may turn the main switching circuitry 810 "on" and one or more of the output switches $Q_1$, $Q_2$, and $Q_3$ "on" concurrently and/or maintain the main switching circuitry 810 and one or more of the output switches $Q_1$, $Q_2$, and $Q_3$ in "on" states concurrently so that at least a portion of the charge and discharge periods of the SIMO converter 801 may overlap. When the signal generator 820 turns the main switching circuitry 810 "on," the signal generator 820 may also be configured to turn one of the output switches $Q_1$, $Q_2$, and $Q_3$ "on" and/or maintain the one or more of the output switches $Q_1$, $Q_2$, $Q_3$ in an "on" state. In addition, the signal generator 820 may be configured to determine a time during the discharge period in which to turn the main switching circuitry 810 "off" and/or maintain the main switching circuitry in an "off" state while switching one or more of the switches $Q_1$, $Q_2$, $Q_3$ "on" and/or maintaining one or more of the switches $Q_1$, $Q_2$, $Q_3$ in an "on" state.

The signal generator 820 may further be configured to determine switching and/or timing relationships between and/or among the output switches $Q_1$, $Q_2$, and $Q_3$. In one example, the controller 812 may be configured to alternatingly turn the output switches $Q_1$, $Q_2$, and $Q_3$ "on" and/or alternatingly maintain the output switches $Q_1$, $Q_2$, and $Q_3$ in "on" states. When one of the switches $Q_1$, $Q_2$, and $Q_3$ is "on," the other of the switches $Q_1$, $Q_2$, and $Q_3$ may be "off." For example, when the switch $Q_1$ is "on," the switches $Q_2$ and $Q_3$ may be "off." Similarly, when the switch $Q_2$ is "on," the switches $Q_1$ and $Q_3$ may be "off." Likewise, when the switch $Q_3$ is "on," the switches $Q_1$ and $Q_2$ may be "off."

Figure 9:
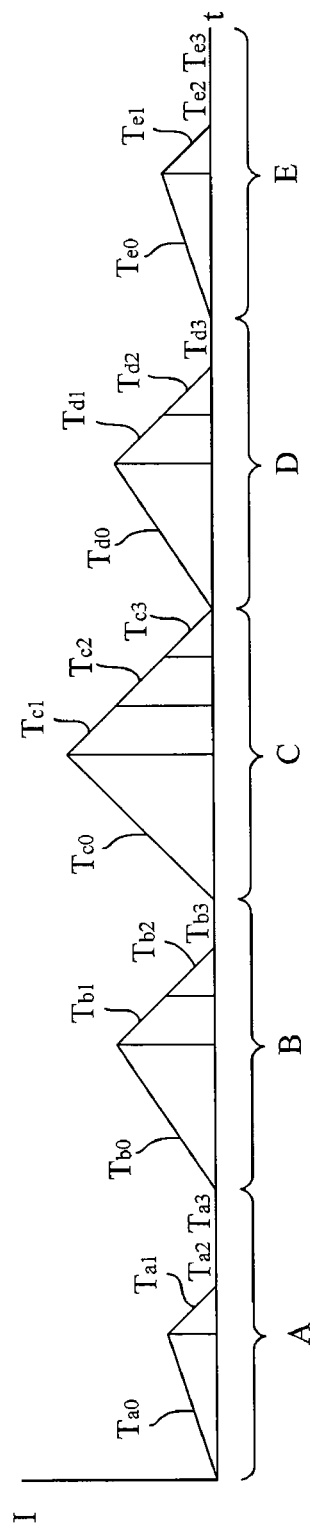
FIG. 9 shows a current (I) versus time (t) diagram of discontinuous current conduction with consolidated sequencing in a SIMO converter, illustrating a fixed time switch timing scheme.
Figure 10:
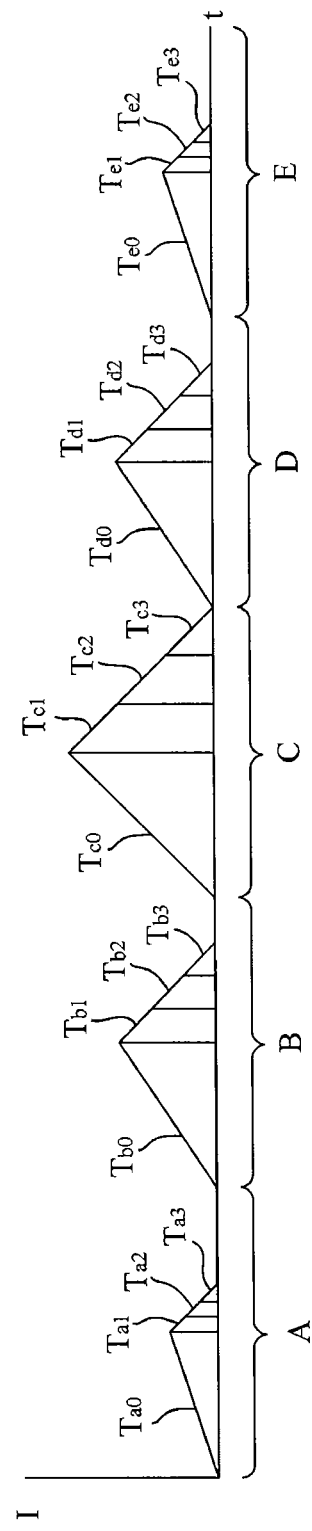
FIG. 10 shows a current (I) versus time (t) diagram of discontinuous current conduction with consolidated sequencing in a SIMO converter, illustrating a fixed ratio switch timing scheme.

In addition or alternatively, the signal generator 820 may be configured to determine a switch timing scheme. The switch timing scheme may include, describe, and/or identify one or more ways in which the charge period and/or the channel conduction periods of the channels 808a-808c are determined. Two example switch timing schemes are a fixed time switch timing scheme and a fixed ratio switch timing scheme. FIG. 9 shows a current (I) versus time (t) diagram of a fixed time switch timing scheme. FIG. 10 shows a current (I) versus time (t) diagram of a fixed ratio switch timing scheme. FIGS. 9 and 10 show current versus time diagrams for a consolidated arrangement of current conduction, where the charge and discharge periods are non-overlapping, similar to the diagram shown in FIG. 6A. Alternatively, the fixed time switch timing scheme and/or the fixed ratio switch timing scheme may be used and/or implemented with other current conduction arrangements, such as interleaved or commutated, and/or for overlapping charge and discharge periods.

FIGS. 9 and 10 show the respective switch timing schemes over five switching cycles, A, B, C, D, and E. The five switching cycles A-E may be representative of switching cycles over a line cycle or a portion of the line cycle, such as a half line cycle. The line cycle may be one cycle of the input signal. FIGS. 9 and 10 show five switching cycles shown over a half line cycle of the input signal. In other examples, there may be more or fewer than five switching cycles per one half of a line cycle. In one example, the input signal may comprise a 60 Hz signal and the switching cycle may have a rate of 100 kHz, yielding over 800 switching cycles per one half of the line cycle.

Each of the switching cycles A-E may include a charging period, where the main switching circuitry 810 is "on." In FIGS. 9 and 10, the charging periods are denoted as $T_{a0}$, $T_{b0}$, $T_{c0}$, $T_{d0}$, $T_{e0}$, for the switching cycles A, B, C, D, and E, respectively. In one example, as shown in FIGS. 9 and 10, as the main switching circuitry 810 is turned "on" during the time periods $T_{a0}$, $T_{b0}$, $T_{c0}$, $T_{d0}$, $T_{e0}$, the amount of current being stored in the storage circuitry 806 over the switching cycles A-C increases and then decreases again over the switching cycles C-E.

Each of the switching cycles A, B, C, D, E may also include a total output channel conduction period. The total output channel conduction period may be a total time period that the output switches $Q_1$, $Q_2$, and $Q_3$ are alternatingly turned "on" and/or current is being conducted through the channels 808a-808c (should there be current available from the storage circuitry 806 to conduct). The total output channel conduction period may comprise individual channel conduction periods for one or more of the switches $Q_1$, $Q_2$, and $Q_3$. The individual channel conduction periods may each be indicative of a time period that a switch $Q_1$, $Q_2$, or $Q_3$ is "on" in a switching cycle and/or that an individual channel 808a, 808b, or 808c is conducting current in the switching cycle. In FIGS. 9 and 10, the individual channel conduction periods for the switches $Q_1$, $Q_2$, and $Q_3$ over the switching cycles A-E are denoted as $T_{a1}$, $T_{a2}$, $T_{a3}$, $T_{b1}$, $T_{b2}$, $T_{b3}$, $T_{c1}$, $T_{c2}$, $T_{c3}$, $T_{d1}$, $T_{d2}$, $T_{d3}$, $T_{e1}$, $T_{e2}$, $T_{e3}$. In some examples, as shown in FIGS. 9 and 10, at least some current may be conducted through one or more of the channels 808a-808c during one or more of the channel conduction periods $T_{a1}$, $T_{a2}$, $T_{a3}$, $T_{b1}$, $T_{b2}$, $T_{b3}$, $T_{c1}$, $T_{c2}$, $T_{c3}$, $T_{d1}$, $T_{d2}$, $T_{d3}$, $T_{e1}$, $T_{e2}$, $T_{e3}$. The amount of current may decrease over the channel conduction period, which may be indicative of a decreasing amount of current being discharged from the storage circuitry 806. In FIG. 9, at least some current is being conducted in the output channels 808a-808c during the channel conduction periods, $T_{a1}$, $T_{b1}$, $T_{b2}$, $T_{c1}$, $T_{c2}$, $T_{c3}$, $T_{d1}$, $T_{d2}$, and $T_{e1}$. In FIG. 10, at least some current is being conducted in the output channels 808a-808c during all of the channel conduction periods, $T_{a1}$-$T_{e3}$.

In some examples, as shown in FIG. 9 for the fixed time switch timing scheme, no current may be conducted through one or more of the output channels 808a-808c during one or more channel conduction periods $T_{a1}$-$T_{e3}$. Where no current is being conducted through a channel 808a-808c even though the switch in the channel is turned "on," no current may be available to be discharged from the storage circuitry 806. In FIG. 9, no current is being conducted during channel conduction periods $T_{a2}$, $T_{a3}$, $T_{b3}$, $T_{d3}$, $T_{e2}$, $T_{e3}$. In other examples, during a single channel conduction period, current may be conducted through the channel during some but not all of the channel conduction period. There may be no current being discharged from the storage circuitry 806 and/or conducted through one or more of the channels 808a-808c because not enough current was stored in the storage circuitry 806 to be discharged during all of the channel conduction periods in a switching cycle. The amount of current stored in the storage circuitry 806 and/or discharged into the plurality of channels 808a-808c may be proportional to the input signal, such as the magnitude of the input signal. In some examples, such as where the input signal is a rectified AC signal, the proportionality comprises an exponential proportionality, such as a squared proportionality between the magnitude of the input signal and the current stored and/or discharged. Where the magnitude of the input signal changes, such as for rectified AC signals, the amount of current stored in the storage circuitry 806 and/or discharged into the plurality of channels 808a-808c may vary over time and/or as a function of time. The time-varying input signal, such as a periodic signal, may have peaks and troughs, or minimum and maximum values. Where the time-varying input signal is at a peak, the amount of current being stored and/or available to be discharged may be at a maximum. Similarly, where the time-varying input signal is at a trough, the amount of current being stored and/or available to be discharged may be at a minimum. In some examples, the minimum amount of stored current may be zero current. Because the input signal may be a time-varying signal and the amount of current stored in the storage circuitry 806 may vary between maximum and minimum values, there may be a threshold stored current level where after a certain time during the total channel conduction period and/or one or more of the individual channel conduction periods, no more current or substantially no more current remains in the storage circuitry 806 that may be drawn through one or more of the output channels 808a-808c.

In the current (I) versus time (t) diagrams shown in FIGS. 9 and 10, the amount of current being stored and discharged is greatest during switching cycle C and decreases for switching cycles B and D, and decreases further for switching cycles A and E. The amounts of currents shown over switching cycles A-E may correspond to and/or may be proportional to a half cycle of an AC signal, such as a rectified AC signal, where the magnitude of the AC is at a minimum (e.g., a zero crossing) at the ends of the half cycle (e.g., the 0 degree and 180 degree points) and where the magnitude of the AC signal is at a maximum (e.g., a peak) at the middle of the half cycle (e.g., the 90 degree point).

For the fixed time switch timing scheme shown in FIG. 9, the channel conduction periods for which switches $Q_1$, $Q_2$, and $Q_3$ are "on" is fixed between switching cycles and/or the same for two or more switching cycles. For example, the channel conduction period $T_{a1}$ for switch $Q_1$ in switching cycle A may be the same as the channel conduction period $T_{b1}$ for switch $Q_1$ in switching cycle B. The channel conduction periods $T_{a1}$ and $T_{b1}$ may further be the same as the channel conduction periods $T_{c1}$, $T_{d1}$, and $T_{e1}$. Similarly, the channel conduction periods $T_{a2}$, $T_{b2}$, $T_{c2}$, $T_{d2}$, and/or $T_{e2}$ for switch $Q_2$ may be the same for one or more switching cycles A-E. Likewise, the channel conduction periods $T_{a3}$, $T_{b3}$, $T_{c3}$, $T_{d3}$, and/or $T_{e3}$ for switch $Q_3$ may be the same for one or more switching cycles A-E.

The fixed time switch timing scheme may be relatively simple to implement because the channel conduction periods may not be determined before and/or after every switching cycle. Instead, in some examples for the fixed time switch timing scheme, the channel conduction periods may be determined once during an initialization period. In other examples, the channel conduction periods may be determined at a frequency less than every switching cycle, such as every sampling period. However, for the fixed time switch timing scheme, there may be one or more switching cycles where one or more of the channels does not conduct current for the entire or at least a portion of the channel conduction period. Where the channel conduction periods are fixed between switching cycles, the channel conduction periods may be too long in at least some of the switching cycles such that all of the channels 808a-808c do not conduct current during their respective channel conduction periods. To illustrate, in the example current versus time diagram shown in FIG. 9, for the switching cycles A, B, D and E, the amount of current stored in the storage circuitry and subsequently discharged was not enough for the current to be conducted through all three channels 808a-808c during their respective channel conduction periods. For switching cycles A and E, there was not enough current stored in and discharged from the storage circuitry 806 for some of the discharged current to be conducted through the second channel 808b and the third channel 808c during the channel conduction periods $T_{a2}$, $T_{a3}$, $T_{e2}$, and $T_{e3}$, respectively. Similarly, for switching cycles B and D, there was not enough current stored in and discharged from the storage circuitry 806 for some of the discharged current to be conducted through the third channel 808c during the channel conduction periods $T_{b3}$ and $T_{d3}$. In the example current versus time diagram shown in FIG. 6, for only one of the switching cycles, switching cycle C, was there enough current discharged from the storage circuitry 806 for current to be conducted through the first, second, and third output channels 808a-808c during the channel conduction periods $T_{c1}$, $T_{c2}$, and $T_{c3}$.

Although the fixed time switch timing scheme may be a relatively simple switch timing scheme to implement because conduction periods may not be determined for every switching cycle, the fixed time switch timing scheme's susceptibility to having switching cycles where at least some of the channels do not conduct current during some or all of their channel conduction periods may be problematic. As an example, in systems where the loads are LEDs, where each LED may provide a color to a mixed color output of the system, a degradation in the mixed color output may occur if some of the LEDs are not conducting during some of the switching cycles in a line cycle. Thus it may be desirable to control a SIMO converter with a timing scheme that dynamically adapts the conduction periods to account for changes in the amount of current being discharged from the storage circuitry 806 during a line cycle.

FIG. 10 shows an example current (I) versus time (t) diagram of a fixed ratio switch timing scheme. For the fixed ratio switch timing scheme, ratios of channel conduction periods between switching cycles are fixed. In one example, the fixed ratio may be a ratio between two channel conduction periods in a switching cycle. A ratio between two conduction periods in one switching cycle may be equal to a ratio between two channel conduction periods in another switching cycle. The ratios may be depicted in equation form, such as:

$$\frac{T_{xm}}{T_{xn}} = \frac{T_{ym}}{T_{yn}} = \frac{T_{an}}{T_{bn}},$$

where $T_{xm}$, $T_{xn}$, $T_{ym}$, and $T_{yn}$ are channel conduction periods for the channels 808a-808c in the switching cycles, x being one of the switching cycles A, B, C, D, or E, y being a different one of the switching cycles A, B, C, D, or E, m being one of the channels 808a, 808b, 808c, and n being a different one of the channels 808a, 808b, 808c.

In another example, the fixed ratio may be a ratio between conduction periods for a given channel. A ratio between two conduction periods of two switching cycles for one channel may be equal to a ratio between two conduction periods of the two switching cycles for a different channel. The ratios may be depicted in equation form, such as:

$$\frac{T_{xm}}{T_{ym}} = \frac{T_{xn}}{T_{yn}} = \frac{T_{an}}{T_{bn}},$$

where $T_{xm}$, $T_{xn}$, $T_{ym}$, and $T_{yn}$ are channel conduction periods for the channels 808a-808c in the switching cycles, x being one of the switching cycles A, B, C, D, or E, y being a different one of the switching cycles A, B, C, D, or E, m being one of the channels 808a, 808b, 808c, and n being a different one of the channels 808a, 808b, 808c.

In another example, the fixed ratio may be a ratio between a conduction period in a switching cycle for a given channel and a total conduction period in the switching cycle. The ratios may be depicted in equation form, such as:

$$\frac{T_{xm}}{T_{xm} + T_{xn} + T_{xp}} = \frac{T_{ym}}{T_{ym} + T_{yn} + T_{yp}},$$

where $T_{xm}$, $T_{xn}$, $T_{xp}$, $T_{ym}$, $T_{yn}$, and $T_{yp}$ are channel conduction periods for the channels 808a-808c in the switching cycles, x being one of the switching cycles A, B, C, D, or E, y being a different one of the switching cycles A, B, C, D, or E, m being one of the channels 808a, 808b, 808c, and n being a different one of the channels 808a, 808b, 808c, and p being another different one of the channels 808a, 808b, 808c.

For the fixed ratio switch timing scheme, the channel conduction periods may be determined for each switching cycle. However, the fixed ratio switch timing scheme may provide dynamic channel conduction periods that are adjusted so that each of the output channels conducts current during their respective conduction periods regardless of the amount of current available to be discharged from the storage circuitry 806. For example, in switching cycle A, despite a relatively small amount of current being discharged from the storage circuitry 806, the channel conduction periods $T_{a1}$, $T_{a2}$, $T_{a3}$ may be set so that each of the channels 808a, 808b, 808c conducts a portion of the current. Subsequently, in switching cycle B, where more current may be discharged from the storage circuitry 806, the channel conduction periods $T_{b1}$, $T_{b2}$, $T_{b3}$ may be set so that each of the channels 808a, 808b, 808c conducts a portion of the current. The channel conduction periods $T_{b1}$, $T_{b2}$, $T_{b3}$ during which the channels 808a, 808b, 808c conduct the current in the switching cycle B may be proportional to the channel conduction periods $T_{a1}$, $T_{a2}$, $T_{a3}$ during which the channels 808a, 808b, 808c conduct the current in the switching cycle A. Similar conduction periods $T_{c1}$, $T_{c2}$, $T_{c3}$, $T_{d1}$, $T_{d2}$, $T_{d3}$, and $T_{e1}$, $T_{e2}$, $T_{e3}$ may be determined for the switching cycles C, D, and E, respectively as the amount of current being discharged from the storage circuitry 806 changes.

The switch timing schemes may impact and/or affect the linearity of the SIMO converter. The more linear the SIMO converter may be, the more operating points at which the SIMO converter may operate for optimal performance. The performance of the SIMO converter may be determined by ringing, overshoot, and/or delay in the output as the SIMO converter operates. An operating point may comprise one or more parameters that may be set or determined for the SIMO converter to operate. The parameters may include input parameters, state parameters, and output parameters, such as input voltage; duty cycles of the switching signals used to switch the main switching circuitry 810 and/or the output switches $Q_1$, $Q_2$, $Q_3$ "on" and "off," current through the output channels 808a-808c, including an average current through the output channels 808a-808c over a sample period; input voltage, charge time, output capacitance, output voltage, load current, and/or the fixed ratios of the channel conduction periods, as examples. As one or more of the parameters change, the ability of the SIMO converter to maintain optimal performance despite the change may be dependent upon the linearity of the SIMO converter. For some SIMO converters, such as flyback and/or boost SIMO converters, the linearity of the SIMO converter may be greater when using the fixed ratio switch timing scheme than when using the fixed time switch timing scheme. As a result, when controlling the timing of the main switching circuitry 810 and/or the output switches $Q_1$, $Q_2$, $Q_3$ with the fixed ratio switch timing scheme, the SIMO converter may have output channels that conduct current over their respective channel conduction periods for all of the switching periods in the line cycle and have improved linearity, as compared to when controlling the timing of the switches using the fixed time switch timing scheme.

In addition or alternatively, the signal generator 820 may be configured to determine an order or an arrangement or sequence of orders that the output channels 808a-808c conduct current during a switching cycle or over a plurality of switching cycles. As previously described with references to FIGS. 6A-6E, 7A-7E, one or more orders may be determined for various arrangements or sequences of current conduction, including the consolidated, interleaving, and commutated arrangements. Referring back to FIGS. 6A and 7A, which show consolidated arrangements for non-overlapping and overlapping charge and discharge periods, respectively, the order in which the output channels 808a-808c conduct current is the same for each switching cycle. FIGS. 11 and 12 show an alternative arrangement or sequence of orders for consolidated current conduction, where an order that the channels 808a-808c conduct during a current switching cycle is a reverse order of an order that the channels 808a-808c conducted current during a previous switching cycle. FIG. 11 shows the alternative arrangement or sequence of orders for non-overlapping charge and discharge periods. FIG. 12 shows the alternative arrangement or sequence of orders for overlapping charge and discharge periods. As shown in FIGS. 11 and 12, for two consecutive switching cycles, an order for one of the consecutive switching cycles is a reverse order of an order for the other of the consecutive switching cycles.

FIG. 11 shows three switching cycles A, B, C. In switching cycle A, the order that the channels 808a-808c conduct current is as follows: the first output channel 808a conducts current for a channel conduction period $T_{a1}$, then the second output channel 808b conducts current for a channel conduction period $T_{a2}$, and then the third output channel 808c conducts current for a channel conduction period $T_{a3}$. In the next switching cycle B, the order that the output channels 808a-808c conduct current is as follows: the third output channel 808c conducts current for the channel conduction period $T_{b3}$, then the second output channel 808b conducts current for the channel conduction period $T_{b2}$, and then the first output channel 808a conducts current for the channel conduction period $T_{b1}$. As illustrated, the order in which the output channels 808a-808c conduct current during the switching cycle B (e.g., the current switching cycle) is the reverse order of the order in which the output channels 808a-808c conducted current during switching cycle A (e.g., the previous switching cycle).

Similarly, in switching cycle C, the order that the channels 808a-808c conduct current is as follows: the first output channel 808a conducts current for a channel conduction period $T_{c1}$, then the second output channel 808b conducts current for a output conduction period $T_{c2}$, and then the third output channel 808c conducts current for a channel conduction period $T_{c3}$. As illustrated, the order in which the output channels 808a-808c conduct current during switching cycle C (e.g., the current switching cycle) is the reverse order of the order in which the output channels 808a-808c conducted current during switching cycle B (e.g., the previous switching cycle).

Similarly, FIG. 12 shows three switching cycles A, B, C. In switching cycle A, the order that the channels 808a-808c conduct current is as follows: the first output channel 808a conducts current for a channel conduction period $T_{a1}$, then the second output channel 808b conducts current for a output conduction period $T_{a2}$, and then the third output channel 808c conducts current for a channel conduction period $T_{a3}$. In the next switching cycle B, the order that the output channels 808a-808c conduct current is as follows: the third output channel 808c conducts current for the channel conduction period $T_{b3}$, then the second output channel 808b conducts current for the channel conduction period $T_{b2}$, and then the first output channel 808a conducts current for the channel conduction period $T_{b1}$. As illustrated, the order in which the output channels 808a-808c conduct current during the switching cycle B (e.g., the current switching cycle) is the reverse order of the order in which the output channels 808a-808c conducted current during switching cycle A (e.g., the previous switching cycle).

Similarly, in switching cycle C, the order that the channels 808a-808c conduct current is as follows: the first output channel 808a conducts current for a channel conduction period $T_{c1}$, then the second output channel 808b conducts current for a output conduction period $T_{c2}$, and then the third output channel 808c conducts current for a channel conduction period $T_{c3}$. As illustrated, the order in which the output channels 808a-808c conduct current during switching cycle C (e.g., the current switching cycle) is the reverse order of the order in which the output channels 808a-808c conducted current during switching cycle B (e.g., the previous switching cycle).

For at least some SIMO converters, using the fixed ratio switch timing scheme to control the flow of current through the SIMO converter may improve the linearity of the SIMO converter, as compared to where the fixed time switch timing scheme is used. In addition or alternatively, conducting the current through the output channels in an order for a current switching cycle that is the reverse of an order for a previous switching cycle may further improve the linearity of the SIMO converter, as compared to where the same order of conducting current through the output channels is used for every switching cycle. As such, for at least some SIMO converters, operating the SIMO converter using the fixed ratio switch timing scheme in combination with conducting the current through the output channels in an order for a current switching cycle that is the reverse of an order for a previous switching cycle may provide better letter linearity for the SIMO converter as compared to where the conduction of current is being controlled in the SIMO converter using the fixed time switch timing scheme, conducting current in an order that is the same for each switching cycle, or a combination thereof.

As previously mentioned, where the signal generator 820 is configured to generate PWM switching signals using one or more counters, the signal generator 820 may also be configured to determine an offset between counter used to generate the PWM output switching signal $g_0$ that is sent to the main switching circuitry 810 and the counter used to generate the PWM output switching signals $g_1$, $g_2$, $g_3$ that are sent to the output switches $Q_1$, $Q_2$, $Q_3$. The signal generator 820 may be configured to determine the offset and generate and output the switching signals $g_0$, $g_1$, $g_2$, $g_3$ when outputting the switching signals in accordance with the alternative arrangement or sequence of orders as described above with reference to FIGS. 11 and 12. In the alternative arrangement, the last output channel to conduct current in the previous switching cycle is the same output channel as the output channel that first conducts current in the current switching cycle after the main switching circuitry 810 charges current in the storage circuitry 806 in the current switching cycle. To illustrate, with reference to FIG. 11, the third output channel 808c, which conducts current over the time period $T_{a3}$ in switching cycle A, is the last output channel to conduct current before the main switching circuitry 810 stores current in the storage circuitry 806 over time period $T_{b0}$ in switching cycle B. The third output channel 808c is also the first output channel to conduct current in switching cycle B after the switching circuitry 810 stores current during time period $T_{b0}$. Similarly, the first output channel 808a, which conducts current over the time period $T_{b1}$ in switching cycle B, is the last output channel to conduct current before the main switching circuitry 810 stores current in the storage circuitry 806 over time period $T_{c0}$ in switching cycle C. The first output channel 808a is also the first output channel to conduct current in switching cycle C after the switching circuitry 810 stores current during time period $T_{c0}$. To simplify the switching scheme, the switch in the last channel to conduct in a switching cycle may be kept "on" during the charge period of the next switching cycle. In the next switching cycle, after the main switching circuitry is turned "off," the switch is already "on" and may begin conducting current being discharged from the storage circuitry 806. To illustrate, as shown in FIG. 13, the third switch Q3 is kept "on" over the time period $T_{3, On}$, which includes the time period $T_{b0}$ in the second switching cycle B that the storage circuitry 806 is being charged. Similarly, the first switch Q1 is kept "on" over the time period $T_{3, On}$, which includes the time period $T_{c0}$ in the third switching cycle C that the storage circuitry 806 is being charged.

Where channel conduction is performed in discontinuous conduction mode (DCM), the storage circuitry 806 may discharge current into the channels 808a-808c for only a portion of a total time between a time that the main switching circuitry 810 switches "off" and a time that the main switching circuitry 810 switches back "on" again. For example, there may be a time period from when no more current is being discharged into the last output channel to when the main switching circuitry 810 turns back "on" to store current in the storage circuitry 806. This time period of no conduction is indicated as $T_{Zero}$ in FIG. 13.

FIG. 13 shows an example switch timing diagram showing when the current is being charged in the main switching circuitry 810 or being discharged through the output channels 808a-808c for the alternated arrangement, in which an offset may be implemented. FIG. 13 is similar to that of FIG. 11, except current magnitudes are shown generally as high and low to indicate charge and discharge periods, respectively, rather than as increasing (charging) and decreasing (discharging) current levels. FIG. 13 also shows time periods of no conduction $T_{Zero}$ that is present between a time when no more current is being conducted through the last channel (e.g., the first output channel 808a or the third output channel 808c) and a time when the main switching circuitry 810 is turned back "on." FIG. 13 also shows a count indicator 1302 indicating the count of the up-down counter for the main switching circuitry 810 a count indicator 1304 indicating the count of the up-down counter for the output switches $Q_1$, $Q_2$, $Q_3$. As shown in FIG. 13, the "on" portions of the PWM switching signal $g_0$ may be set so that the maximum and minimum count values of the up-down counter for the main switching circuitry 810 occur in the middle of the "on" portions of the PWM switching signal $g_0$. In addition, FIG. 13 shows a first set of first and second compare value indicators 1306, 1308 that may be used by the signal generator 820 to determine whether a sample or portion of the switching signal $g_0$ sent to the main switching circuitry 810 corresponding to the count should be high or low, as previously described. Also, FIG. 13 shows a second set of first and second compare value indicators 1310 and 1312 that may be used by the signal generator 820 to determine whether a sample or portion of the switching signals $g_1$, $g_2$, $g_3$ sent to the output switches Q1, Q2, Q3 corresponding to the count should be high or low, as previously described.

In the alternative arrangement where the current order of output channel conduction is a reverse order of a previous order of output channel conduction, the conduction periods may be the same for the order and the reverse order. For example, as shown in FIG. 13, comparing switching cycles A and B, the channel conduction period $T_{a3}$ may be the same as the channel conduction period $T_{b3}$. In addition, the up-down counter which controls these signals may be synchronized for all switches. However, where periods of zero conduction time $T_{Zero}$ are present, the periods of zero conduction interfere with the timing of the channel conduction periods in a fully synchronized system, causing the conduction periods to not be the same. To counter the interference from the zero conduction time $T_{Zero}$, an offset between the up-down counter used to generate the switching signal $g_0$ for the main switching circuitry 810 and the up-down counter used to generate the switching signals $g_1$, $g_2$, $g_3$ for the output channels 808a-808c may be determined. As shown in FIG. 13, the offset may cause the up-down counter for the output switches $Q_1$, $Q_2$, $Q_3$, as indicated by the up-down counter indicator 1304 to lead the up-down counter for the main switching circuitry 810. In one example, the offset, $T_{Offset}$ may be determined by:

$$T_{Offset} = \tfrac{1}{2} \cdot T_{Zero}.$$

By setting the offset, $T_{Offset}$, to an amount that is one-half the period of no conduction $T_{Zero}$, the output channels 808a-808c may all conduct current during consecutive switching cycles for the forward and reversed sequences, and the conduction times between the current and reversed sequences may also be equal. Additionally, the first switch Q1 may switch "on" and "off" at the same count value, e.g., when the count value, whether it is increasing or decreasing, is at the same compare value. Similarly, the last switch Qn (e.g., the third switch Q3) may switch "on" and "off" at the same count value, e.g., when the count value, whether it is increasing or decreasing, is at the same compare value.

In some example systems, synchronous counters having equal forward and reverse time values without implementing an offset may be used where the zero conduction time, $T_{Zero}$, is present. Those systems may require the use of four different compare values, which may not be available in a microcontroller. By implementing the offset, the forward and reverse time values may be equal with no more than two compare values.

Referring back to FIG. 8, the signal generator module 820 may be configured to determine the timing parameters, including charge periods, channel conduction periods, start times, stop times, ratios between channel conduction periods, and/or other timing parameters used to determine when to switch the main switching circuitry 810 and/or the output switches $Q_1, Q_2, Q_3$ "on" and "off" and/or for one or more of the arrangements or sequences of channel conduction, switch timing schemes, relationships between the main switching circuitry 810 and/or the output switches $Q_1, Q_2, Q_3$, and/or arrangements or sequences of switching orders. The signal generator module 820 may be configured to determine the timing parameters on various bases. For example, one or more of the timing parameters may be determined on a sample period basis. To illustrate, where the fixed time switch timing scheme is used, the channel conduction times may be determined on a sample period basis. The signal generator module 820 may be configured to determine whether to change one or more of the channel conduction times every sample period. As another example, one or more of the timing parameters may be determined on a switching cycle basis. To illustrate, where the fixed ratio switch timing scheme is used, the channel conduction times may be determined on a switching cycle basis. The signal generator module 820 may be configured to determine whether to change one or more of the channel conduction times every switching cycle. One or more of the timing parameters may be determined on bases other than the time period basis or the switching cycle basis.

In addition or alternatively, the signal generator module 820 may be configured to determine the timing parameters at the same time and/or on the same basis, or alternatively at different times and/or on different bases. To illustrate, in one example, the channel conduction periods for all of the output channels 808a-808c and the order that the channels 808a-808c conduct the current may be determined every switching cycle, and the charge period and the ratios may be determined every sampling period. Other configurations may be possible.

One or more of the timing parameters may be predetermined values and/or set to initial values that may or may not be changed as current drawn through the output channels 808a-808c is measured and/or switching signals $g_0, g_1, g_2, g_3$ are generated. The timing parameters may be stored in memory, such as the memory 1604 of the computer system 1600 shown in FIG. 16, which may be a component of and/or accessed by the signal generator module 820. The signal generator module 820 may be further configured to determine one or more of the timing parameters and/or whether to change the one or more timing parameters, and if so, by how much, by being in communication with one or more of an accumulator module 822, a sampler module 824, a comparator module 826, a compensator or compensation module 828, a timer module 830, and/or a zero detector module 832. In addition, the accumulator module 822, the sampler module 824, the comparator module 826, the compensation module 828, the timer module 830, and the zero detector module 832 may be in communication with each other.

The accumulator module 822 may be configured to measure current drawn through one or more of the output channels 808a-808c over a switching cycle. The accumulator module 822 may further be configured to determine a time-accumulated amount of current through one or more of the output channels 808a-808c over a predetermined period of time. In one example, the predetermined period of time may be a sample period of the input signal. The sample period may be a time period in which the average current through one or more of the capacitors C1, C2, C3 in the output channels 808a, 808b, 808c, respectively is zero. For a rectified AC signal, the sample period may be a quarter cycle. In one example, the accumulator module 822 may comprise RC averaging circuitry or RC filtering circuitry. In another example, the accumulator module 822 may comprise an integrator or integrating circuitry, as described in further detail below with respect to FIG. 13. The accumulator module 822 may be configured to measure the current drawn on a per channel basis. For example, the accumulator module 822 may be configured to determine an accumulated current value over the predetermined time period for each of the channels 808a-808c.

The accumulator module 822 may be configured to send the accumulated current values of each channel 808a-808c to a sampler module 824. The sampler module 824 may comprise an analog-to-digital converter (ADC). The sampler module 824 may be configured to sample the accumulated current values provided by accumulator module 822 at a sample rate. The sampler module 824 may further be configured to send the sampled accumulated current values to a comparator module 826. The comparator module 826 may be configured to compare the sampled accumulated current values to predetermined and/or desired accumulated current values. The predetermined and/or desired accumulated current value may be stored in memory, such as the memory 1604 in the computer system 1600 shown in FIG. 16, and/or may be accessed by the comparator module 826. In addition or alternatively, the predetermined and/or desired accumulated current value may change based on changes in requirements and/or operating points of the system 800. For example, if an output voltage or current draw for one or more of the output channels 808a-808c is changed, the predetermined and/or desired accumulated current value may be changed, and the comparator module 826 may be configured to identify the change.

If the comparator module 826 determines and/or identifies one or more differences between the sampled accumulated current values and the predetermined accumulated current values, the comparator module 826 may be configured to send the difference information to the compensation module 828. The compensation module 828 may be configured to adjust and/or change one or more of the timing parameters, such as the charge period, the channel conduction periods, and/or the ratios between the channel conduction periods. As an example, if the difference information received from the comparator module 826 indicates that less current was drawn through one or more of the channels 808a-808c, then the compensation module 828 may be configured to increase the charge period (i.e., the time to keep the main switching circuitry 810 "on"). Similarly, if the difference information received from the comparator module 826 indicates that more current was drawn through one or more of the channels 808a-808c, then the compensation module 828 may be configured to decrease the charge period. In addition, for the fixed time switch timing scheme, the compensation module 828 may be configured to adjust one or more channel conduction periods for the next sample period, and for the fixed ratio switch timing scheme, the compensation module 828 may be configured to adjust one or more of the ratios between the channel conduction periods. For example, if the difference information received from the comparator module 826 indicated that less current was drawn through the channels 808a-808c than desired because the first output channel 808a drew less current, then for the fixed time switch timing scheme, the comparator module 826 may be configured to adjust the channel conduction period for the first output channel 808a so that the current drawn through the first output channel 808a may meet and/or achieve the predetermined and/or desired current draw through the first output channel 808a for the next sample period. Similarly, for the fixed ratio switch timing scheme, one or more of the ratios between the channel conduction times may be adjusted so that the first output channel 808a may meet and/or achieve the predetermined and/or desired current draw through the first output channel 808a for the next sample period. After the compensation module 828 adjusts and/or modifies one or more of the timing parameters, the compensation module 828 may be configured to send the adjusted and/or modified timing parameter information to the signal generator module 820. The signal generator module 820 may then use the adjusted and/or modified timing parameter information to generate modified and/or adjusted switching signals $g_0, g_1, g_2, g_3$ and send the switching signals $g_0, g_1, g_2, g_3$ to the main switching circuitry 810 and/or the output switches $Q_1, Q_2, Q_3$ to turn "on" and "off" draw to the predetermined and/or desired current draw over the next sample period.

Alternatively, if the comparator module 826 determines and/or identify no differences between the sampled accumulated current values and the predetermined and/or desired current values, the comparator module 826 may be configured to send information indicating no differences to the compensation module 828 and/or directly to the signal generator 820. The signal generator 820 may be configured to generate switching signals $g_0, g_1, g_2, g_3$ without using modified and/or adjusted timing parameters and/or using the timing parameters used to generate the switching signals $g_0, g_1, g_2, g_3$ from the previous sample period.

In addition or alternatively, the comparator module 826 may be configured to change and/or detect a change in the predetermined and/or desired current draw. The comparator module 826 may further be configured to perform the comparison measured current draw with the changed desired current draw.

To illustrate, where the loads Z1, Z2, and Z3 comprise LEDs, amounts of current to be drawn through each of the LEDs over a sample period may be predetermined and/or desired to achieve a desired color output. The comparator module 826 may compare actual currents drawn over the sample period, as indicated by the sampled accumulated current values received from the sampler module 824, with the predetermined and/or desired amounts of current drawn. If no differences between the actual currents drawn and the predetermined and/or desired current draws, then SIMO converter 801 may be outputting the desired color output and the signal generator 820 may be configured to output switching signals $g_0, g_1, g_2, g_3$ to the main switching circuitry 810 and the output switches $Q_1, Q_2, Q_3$ over the next sampling period using the timing parameters, such as the charge period and the ratios, that were used to switch "on" and "off" the main switching circuitry 810 and the output switches $Q_1, Q_2, Q_3$ in the previous sampling period. Alternatively, if the comparator module 826 detects differences, then the comparator module 826 may send the difference information to the compensation module 828, and the compensation module 828 may modify and/or adjust one or more of the timing parameters. The compensation module 828 may then send the modified and/or adjusted timing parameters to the signal generator module 820, and the signal generator module 820 may generate the switching signals $g_0, g_1, g_2, g_3$ using the modified and/or adjusted timing parameters so that the desired color output may be generated by the SIMO converter 801. In some examples, the comparator module 826 may also be configured to determine a change in the predetermined and/or desired amounts of current draw. The change in the desired current draw may be based on a change in a desired color output, which may result in a change in a total current draw through all of the plurality of channels during the sample period, or a change in current draw through only some of the plurality of output channels.

Where the fixed ratio switch timing scheme is used, the signal generator module 820 may be configured to determine whether to change one or more timing parameters, such as channel conduction periods, after each switching cycle. To do so, the signal generator module 820 may communicate with the timer module 830 and/or the zero detector module 832. In one example, the signal generator module 820 may communicate with the timer module 830 and/or the zero detector module 832 to determine a discharge period, which may be an amount of time taken for the storage circuitry 806 to discharge all or substantially all of the stored current. To determine the discharge period, the timer module 830 may be configured to start a timer when current begins being discharged into one or more of the output channels 808a-808c. Where the charge and discharge periods are non-overlapping periods, the timer module 830 may be configured to start the timer when the main switching circuitry 810 turns "off" and one or more of the output switches $Q_1, Q_2, Q_3$ turn "on" to begin drawing the stored current through one or more of the output channels 808a-808c. Where the charge and discharge periods are overlapping periods, the timer module 830 may be configured to start the timer when the main switching circuitry turns "on" and one or more of the output switches $Q_1, Q_2, Q_3$ also switch "on" to begin drawing current through one or more of the output channels 808a-808c.

Concurrently, the zero detection circuitry 832 may be configured to measure the current being drawn through the output channels 808a-808c. The zero detection circuitry 832 may further be configured to determine and/or identify when the no more current is being drawn through the output channels 808a-808c. The zero detection circuitry 832 may also be configured to notify the timer module 830 when no more current is being drawn through the output channels 808a-808c. When the timer module 830 is notified, the timer module 830 may be configured to stop the timer. The time period or duration from the time that timer started to the time that the timer stopped may be determined as the discharge period. The discharge period may or may not be the same as the total channel conduction period that the output switches $Q_1, Q_2, Q_3$ were turned "on" to conduct current through the output channels 808a-808c. The timer module 830 may be configured to communicate the discharge period information to the signal generator module 820. Where the fixed ratio switch timing scheme is used, the timer module 830 may be configured to communicate the discharge period information to the signal generator module 830 after each switching cycle. The signal generator module 830 may then use the discharge period information to generate the channel conduction periods for the next switching cycle. For example, the signal generator module may be configured to calculate the channel conduction periods for the next switching cycle by multiplying the discharge period information received from the timer module 830 with the ratios between the channel conduction periods that are determined for the sample period. In this example, the signal generator module 820 may determine channel conduction periods for a next switching cycle based on the fixed ratios and an actual or measured discharge period determined for a current switching cycle. Where the input signal has a low frequency, such as 60 Hz, and there are many switching cycles (e.g., more than 800) within one sampling period of the input signal, the amount of current being drawn through the channels 808a-808c may change relatively little from switching cycle to switching cycle. As a result, the actual discharge period for the current switching cycle may be used as an estimated total discharge period for the next switching cycle to determine the channel conduction periods. In addition or alternatively, because the amount of current being drawn through the channels 808a-808c may change relatively little from switching cycle to switching cycle, the channel conduction periods may not be determined after and/or for every switching cycle (i.e., on a per switching cycle basis). Instead, the channel conduction periods may be determined after a plurality of switching cycles have passed, such as every third switching cycle or every tenth switching cycle, as examples.

FIG. 14 shows an example integrator 1400 that may be used as the accumulator module 822 in the system 800 to obtain a time-accumulated average current value over a sample period through one or more of the output channels 808a-808c. In addition or alternatively, the integrator 1400 may be configured to output one or more signals that are indicative of the time-accumulated average current value over the sample period. The integrator 1400 may be configured to determine the time-accumulated average amount of current being discharged through one of the output channels 808a-808c, and each of the channels 808a-808c may be in communication with and/or connected to one integrator 1400. In the example system 800 shown in FIG. 8, three integrators 1400 may be used, each integrator being connected to one of the output channels 808a-808c. One of the channels 808a-808c, denoted as output channel 808n, is represented in FIG. 14 using a load Zn connected in parallel with a capacitor Cn and in series with a switch Qn. The output channel 808n further includes a sense resistor Rsn connected to the switch Qn. Current may flow from the switch Qn through the sense resistor Rsn when the switch Qn is "on."

The integrator 1400 may be connected to the channel 808n at node A, in between the output switch Qn and the sense resistor Rsn. where some of the current $I_{channel}$ flowing through the channel 808n may be diverted from flowing through the sense resistor Rsn and instead may be drawn into the integrator 1300. In some examples, the resistance of R3 may be much larger than the resistance of the sense resistor Rsn (e.g., approximately 7 kΩ for R3 and approximately 0.5Ω for Rsn) and so a large proportion of the channel current $I_{channel}$ may flow through the sense resistor Rsn. The integrator 1400 may be connected to the channel 808n at node A so that the output voltage $V_{out}$ of the integrator 1400 may be proportional to the time integral of channel current $I_{channel}$ and the voltage across sense resistor Rsn. In further detail, by sampling the output voltage $V_{out}$ supplied by the integrator 1400 at a sampling rate where the net current through the capacitor Cn over the sample period is zero, the average current flowing through the load Zn may be determined by measuring the current or voltage across the sense resistor Rsn.

In the example integrator 1400, a portion $I_c$ of the channel current $I_{channel}$ flowing through the resistor R3 and into the capacitor $C_{int}$ may be proportional to the voltage Vs across the sense resistor Rsn. Further, the voltage $V_c$ across the capacitor $C_{int}$ may be proportional to the output voltage $V_{out}$ being output from the operational amplifier (op-amp) 1402. The voltage $V_c$ across the capacitor $C_{int}$ is proportional to the integral of the current $I_c$ flowing into the capacitor. Additionally, the voltage drop $V_s$ across the sense resistor Rs may be estimated as the product of channel current $I_{channel}$ and the resistance Rs (since a large proportion of the channel current $I_{channel}$ is flowing through the sense resistor Rs). As such, the output voltage $V_{out}$ may be proportional to the sense resistor Rs and the integral of the channel current $I_{channel}$. The average current through the channel 808n may be determined by integrating the current $I_{channel}$ over the sample period and then dividing by the sampling time. Accordingly, the integral of the channel current $I_{channel}$ over the sample period may be equivalent to the product of the average current flow $I_{in\_avg}$ through the channel 808n and the sample period $T_{sample}$. As such, the output voltage $V_{out}$ of the integrator 1300 may be proportional to the resistance of the sample resistor Rsn, the sampling period $T_{sample}$, and the average current $I_{in\_avg}$ through the channel 808n over the sample period $T_{sample}$. In one example, the output voltage $V_{out}$ may be calculated using the following equation:

$$V_{out} = \frac{2R_s}{RC} T_{sample} \cdot I_{in\_avg},$$

where $R_s$ is the resistance of the sense resistor Rs, R is the resistance value of resistors R1, R2, R3, and R4, C is the capacitance of the capacitor $C_{int}$, $T_{sample}$ is the sampling period of the input signal, and $I_{in\_avg}$ is the average current drawn through the output channel 808n over the sample period $T_{sample}$. By measuring the output voltage $V_{out}$ after each sample period, and knowing the resistance values of the sense resistor Rs and the resistors R1-R4 and the sample period $T_{sample}$, the average current draw $I_{in\_avg}$ through the channel 808n may be determined.

During each switching cycle, the channel current $I_{channel}$ may flow through the channel 808n and an associated charge may be stored in the capacitor $C_{int}$, generating a voltage across the capacitor $V_c$. As the channel current $I_{channel}$ flows through the channel 808n for each of the switching cycles in the sampling period, charge accumulates in the capacitor $C_{int}$ and the voltage across the capacitor $C_{int}$ increases. As previously described, the output voltage $V_{out}$ from the op-amp 1402 may be proportional to the voltage $V_c$ across the capacitor $C_{int}$. For example, where the resistors R1, R2, and R4 have the same resistances, the output voltage $V_{out}$ is twice as large as the voltage across the capacitor $C_{int}$. As such, as the voltage $V_c$ across the capacitor $C_{int}$ accumulates, the output voltage $V_{out}$ accumulates as well. The accumulated output voltage $V_{out}$ may be sent to the sampler module 824, which may sample the accumulated output voltage $V_{out}$ at every sample period. As previously described, for rectified AC input signals, such as input signals generated for power factor correction (PFC) requirements, the sample period may be one-fourth the period of the input signal. Some PFC requirements may require a power factor of 0.9 and/or near unity. By sampling the accumulated output voltage $V_{out}$ at every sample period, the average current flow $I_{in\_avg}$ through the output channel 808n over the sample period may be determined.

The accumulated voltage $V_c$ across the capacitor $C_{int}$ may be reset to zero after each sample period so that a next accumulated voltage $V_c$ for the next sample period may be determined. To reset the voltage $V_c$ to zero, the integrator 1400 may further include reset circuitry, such as a switch $Q_r$. A switching signal $g_{reset}$ may switch the switch $Q_r$ "on," discharging the charge stored in the capacitor $C_{int}$ and resetting the voltage $V_c$ to zero. The switching signal $g_{reset}$ may be sent to the switch $Q_r$ to switch the switch $Q_r$ "on" once every sampling period.

The integrator 1400 may be used to determine a steady-state average current value over a sample period for an input signal having a ripple that oscillates at a slow rate (e.g., 60 Hz), and that has an average input value that does not change. Accumulator modules 822 other than the integrator 1400 may alternatively be used. An example alternative accumulator module 822 may be an RC filter. Using the integrator 1400 rather than the RC filter may have various advantages. For example, the components for the RC filter may be much larger than the components for the integrator 1400. In addition, for the integrator, the determination of the average current may be a more discrete determination of the average current over the sample period, whereas for the RC filter, there may be more carryover in current between sample periods. The integrator 1400 may also have a better dynamic range than the RC filter.

Referring back to system 800 shown in FIG. 8, one or more of the loads Z1, Z2, Z3 may be floating with respect to ground, and be referenced to a common output voltage $V_{out}$ (i.e. a non-ground reference point). Additionally, one or more of the main switching circuitry 810, the output switches $Q_1, Q_2, Q_3$, and/or the current sense resistors Rs1, Rs2, Rs3 are referenced to a common ground. In alternative systems, the loads are referenced to ground and the main switching circuitry and the output switches are floating and referenced to a common non-ground point (e.g., a common output voltage). The configuration of the system 800 shown in FIG. 8 may be advantageous over the alternative systems for applications where the loads do not communicate with each other, provide outputs to other circuits (e.g., microprocessors) that communicate with each other, and/or are dependent of each other. One example application is LED lighting. By configuration the system 800 so that the loads are floating with respect to ground, and so that the main switching circuitry 810, the output switches $Q_1, Q_2, Q_3$, and/or the current sense resistors Rs1, Rs2, Rs3 are referenced to ground, one or more of the components used to measure the current drawn through the output channels 808a-808c, such as the accumulator module 822, the zero detector, and/or generate the switching signals $g_0, g_1, g_2, g_3$ and drive the main switching circuitry 810 and the output switches $Q_1, Q_2, Q_3$, such as the signal generator 820, may also be configured to be referenced to the common ground. By referencing these components all to the common ground, rather than the output loads, the system 800 may be designed and/or the components may be configured in the system 800 so that the main circuitry 810 and the output switches $Q_1, Q_2, Q_3$ may be driven and/or the current drawn through the output channels 808a-808c may be measured and/or monitored more easily.

In one configuration of the system 800, one of the output switches $Q_1, Q_2, Q_3$ is a passive switch, such as a diode, and is configured not to switch "on" and "off" based on reception of an output switching signal from the controller 812. In one example, the one output switch is an end switch, such as the last output switch (e.g., the third output switch Q3) or the first output switch (e.g., the first output switch Q1). In this configuration, the controller 812 is configured to generate a switching signal $g_0$ that is sent to the main switching circuitry 810 and a plurality of output switching signals, where the number of output switching signals that are generated is one less than the total number of output channels. Where one of the output switches $Q_1, Q_2, Q_3$ is a passive switch, the output channels 808a-808c may be configured such that the output channel 808a-808c having the passive switch has an output voltage that is greater than the output voltage of the other output channels 808a-808c. As an example, the first output switch $Q_1$ in the first output channel 808a and the second output switch $Q_2$ in the second output channel 808b may comprise an active switch, such as a field effect transistor (FET) or a bipolar junction transistor (BJT) in series with a reverse blocking diode, and be configured to receive switching signals $g_1$ and $g_2$, respectively. The third output switch $Q_3$ in the third output channel 808c may comprise a passive switch, such as a diode. As long as the output voltage for the third channel 808c is greater than the output voltages for the first and second channels 808a, 808b, then when the main switching circuitry 810 and the output switches $Q_1$ and $Q_2$ are "off," current being discharged from the storage circuitry 810 will discharge through the third output channel 808c.

In the system 800 shown in FIG. 8, the signal generator module 820, the accumulator module 822, the sampler module 824, the comparator module 826, the compensation module 828, the timer module 830, and the zero detector module 832, are shown as components of the controller 812. In one embodiment of the system 800, the controller 812 may be a controller system that includes the signal generator module 820, the accumulator module 822, the sampler module 824, the comparator module 826, the compensation module 828, the timer module 830, and the zero detector module 832 as parts or components of the controller system. In alternative systems, one or more of the components may be components that are separate from the controller 812 and/or may be configured to communicate with the controller 812 and/or one or more components of the controller 812. Also, in alternative systems, rather than the controller 812 being a single controller as shown in FIG. 8, the controller 812 may instead be a controller system that includes multiple controllers, where each controller in the controller system includes one or more of the components. For example, one controller includes the signal generator module 820, another controller includes the accumulator module 822, another controller includes the sampler module 824, another controller includes the comparator module 826, another controller includes the compensation module 828, another controller includes the timer module 830, and another controller includes the zero detector module 832. Two or more of the multiple controllers may be in communication with each other and/or with the SIMO converter 801. As an example, a first module or component may be included in a first controller and a second module or component may be included in a second controller. The first controller and the second controller may be the same controller or different controllers. Similarly, a third module or component may be included in a third controller that is the same controller as or a different controller from the first controller and/or the second controller. Similar configurations and/or combinations of configurations are possible for various numbers of controllers and/or modules or components included in the controller. In still other alternative systems, there may be multiple SIMO converters and the controller 812 may be configured to control the multiple SIMO converters. In addition or alternatively, the controller 812 and/or one or more of the signal generator module 820, the accumulator module 822, the sampler module 824, the comparator 826, and compensation module 828, the timer module 830, and the zero detector module 832 may be hardware based, software based, or a combination thereof. For example, the controller 812 and/or one or more components of the controller 812 may be implemented using one or more digital signal processors, integrated circuits, application specific integrated circuits, field programmable gate arrays, and/or microcontrollers. In one example, the microcontroller may be a Texas Instruments TMS320F28335 microcontroller, although other types of microcontrollers may be used. In addition or alternatively, the controller 812 and/or one or more of the signal generator module 820, the accumulator module 822, the sampler module 824, the comparator 826, and compensation module 828, the timer module 830, and the zero detector module 832 may be and/or operated using all or some of the components of the computer system 2100 shown in and described with reference to FIG. 21.

FIG. 15 shows an example zero-detect circuit 1500 that may be used as the zero detector module 832 in the system 800 to measure the time current is being drawn through the output channels 808a-808c. The zero-detect circuit 1500 may be configured to output a signal that may be used by one or more components of the controller 812, such as the timer 830, to determine and/or identify when no more current is being drawn through the output channels 808a-808c. As shown in FIG. 15, the zero-detect circuit may be connected to the SIMO converter 801 at node A, which may be connected to the output of the charge/discharge circuitry 801 and the nodes $V_{out1}$, $V_{out2}$, $V_{out3}$ at which the output voltage across the loads is determined. The example zero-detect circuit 1500 may comprise a comparator 1502, which may be an operational amplifier (op-amp) having positive and negative terminal connected to a resistor R1, a resistor R2, a diode D1, and diode D2, and a resistor R3.

The zero-detect circuit 1500 may be configured to output an output signal $V_{ZCD}$ from the comparator 1502 that is low when an output voltage across the storage circuitry 806 (e.g., voltage across the secondary winding of a transformer) is below a zero-crossing voltage and high when the voltage across the storage circuitry 806 is above the zero-crossing voltage. The zero-crossing voltage may be a voltage that is proportional and/or referenced to the DC voltage Vdd and is indicative of when current is no longer being discharged from the storage circuitry 806. Where R1 and R2 are equal, the zero-crossing voltage is one-half Vdd. The comparator 1502 may be configured to compare the output voltage across the storage circuitry 806 with the zero-crossing voltage and/or determine when the voltage across the storage circuitry 806 exceeds or falls below the zero-crossing voltage. When the output voltage across the storage circuitry 806 exceeds the zero-crossing voltage, then the comparator 1502 may output a high signal, indicating that current is being discharged from the storage circuitry 806 into the plurality of channels 808a-808c. Alternatively, when the output voltage across the storage circuitry 806 falls below the zero-crossing voltage, then the comparator 1502 may output a low signal, indicating that current is not being discharged from the storage circuitry 806 into the plurality of output channels 808a-808c.

In some situations, the output voltage across the storage circuitry may ring or oscillate about the zero-crossing voltage after current is no longer being discharged from the storage circuitry 806 but before the main switching circuitry 810 is turned back "on" to charge the storage circuitry 806. In those situations, the comparator 1502 may detect the ringing, outputting high and low output signals before the main switching circuitry 810 is turned back "on." To properly determine the amount of discharge time, the timer 830 may be configured to ignore the ringing. When the main switching circuitry 810 turns "off" and current begins to be discharged into the plurality of output channels 808a-808c, the comparator 1502 outputs the zero-detect output signal $V_{ZCD}$ as high and the timer is configured to begin. When no more current is being discharged, the zero-detect output signal $Z_{ZCD}$ transitions from high to low, and thereafter may oscillate high and low as the output voltage of the storage circuitry 806 rings. The timer 830 may be configured to stop at the first transition from high to low and thereafter ignore the subsequent high and low outputs from the comparator 1502. When the main switching circuitry 810 turns back "on," the zero-detect output signal $V_{ZCD}$ remains low and then transitions to high again when the main switching circuitry 510 turns "off" and current stored in the storage circuitry 806 begins to flow into the output channels 808a-808c. The timer 830 may be configured to detect when the ringing stops and the main switching circuitry 810 turns "on." The timer 830 may then be configured to start again when the main switching circuitry 810 switches from "on" to "off" and the stored current begins to flow into the output channels 808a-808c.

The diodes D1 and D2 may function as a safeguard to make sure that the voltage on the positive terminal does not go above Vdd and does not go below ground. The diode D1 may function to prevent the voltage on the positive terminal from exceeding Vdd and the diode D2 may function to prevent the voltage on the positive terminal from falling below ground.

FIG. 16 shows an alternative system 1600 that includes the example SIMO converter 801 in communication with the controller 812, and may further include an electromagnetic interference (EMI) filter 1604, a phase detection module 1606, and/or an overvoltage protection module 1608, in communication with the SIMO converter 801 and the controller 812. The alternative system 1600 also shows the input voltage Vin as a sinusoidal input, which provides the sinusoidal input to a rectifier 1602. The rectifier 1602 may be configured to send a rectified sinusoidal input signal to the EMI filter 1604. In other configurations, the EMI filter 1604 may be configured in between the sinusoidal input Vin and the rectifier 1604. In still other configurations, the EMI filter 1604 may comprise two EMI filters, one on each side of the rectifier 1604. In those configurations, the EMI filter 1604 may receive the sinusoidal input Vin and output a signal that is sent to the rectifier 1602.

FIG. 16 shows the overvoltage protection module 1608 and the phase detection module 1606 configured as components of the system 1600 separate from the SIMO converter 801 and the controller 812. In other example configurations, the overvoltage protection module 1608, and/or the phase detection module 1606 may be configured as a component of the SIMO converter 801 or the controller 812. In alternative systems, the system 1600 may include multiple controllers, where each controller comprises one or more of the accumulator module 822, the sampler module 824, the comparator module 826, the compensator module 828, the signal generator module 820, the timer module 830, the zero detection module 832, the phase detection module 1606, and/or the overvoltage protection module 1608. Various combinations are possible. In addition or alternatively, the overvoltage protection module 1608 and the input zero-cross detection module 1606 may be hardware based, software based, or a combination thereof.

The EMI filter 1604 may be configured to attenuate noise emitted from the SIMO converter 801 and/or noise in the surrounding environment so as to protect the SIMO converter 801 or other electronic devices near the SIMO converter 801. The EMI filter 1604 may be configured as LC filter and may further comprise inductive or shunt damping configurations.

The overvoltage protection module 1608 may be connected to the output circuitry 804 and may be configured to prevent the output voltage Voutn across the load capacitors Cn from reaching dangerously high voltage levels. When configured as hardware, the overvoltage protection module 1608 may be configured to determine when the voltage across the load capacitors Cn meets or exceeds a threshold voltage. In one example, the threshold voltage may be 50 volts, although other threshold voltages may be used. In the configuration of the SIMO converter 801, the load capacitors Cn may not be connected to ground. To detect the voltage across the load capacitors Cn where they are not connected to ground, overvoltage protection circuitry 1700 may comprise isolated detection circuitry, such as optocouplers, to detect when the voltage across the load capacitors Cn meets or exceeds the threshold voltage.

Figure 17:
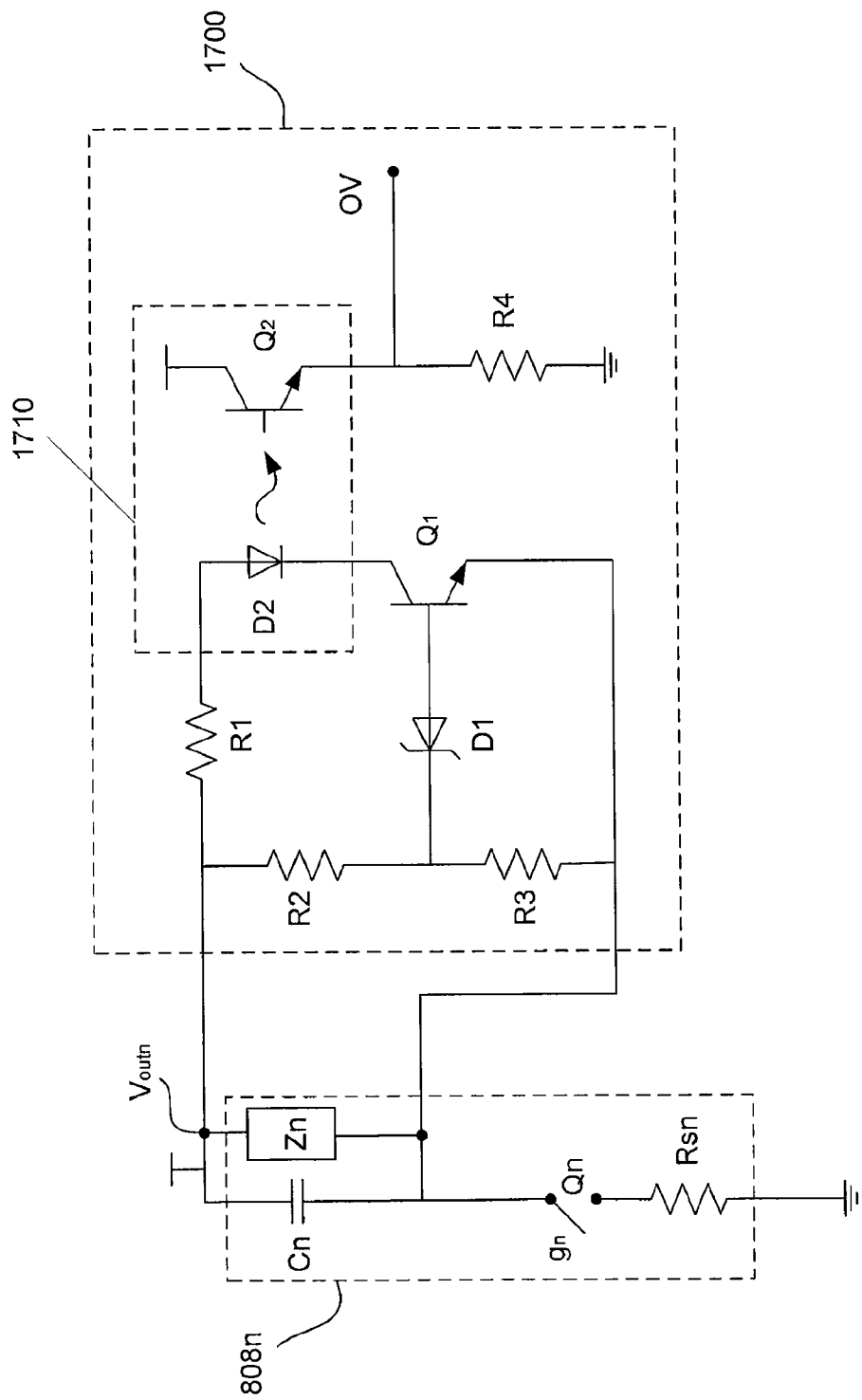
FIG. 17 shows an example overvoltage protection circuit that may be used as the overvoltage protection module in the alternative system shown in FIG. 16.

FIG. 17 shows an example overvoltage protection circuit 1700 that may be used as the overvoltage protection module 1608 for the system 1600. The overvoltage protection circuit 1700 may be connected to the output circuitry 804 by being connected in parallel with the load capacitors C1, C2, C3 and output loads Z1, Z2, Z3 channels 808a-808c. One overvoltage protection circuit 1700 may be connected to each of the output channels 808a-808c. Alternatively, less than all of the output channels 808a-808c may be connected to an overvoltage protection circuit 1700. In another example, one overvoltage protection circuit 1700 may be connected to one of the output channels 808a-808c, and may be configured without having isolation circuitry, such as an optocoupler. In this example, each of the output channels 808a-808c may have overvoltage protection only for a time that current is conducting through the output channel. One of the channels 808a-808c, denoted as output channel 808n, is represented in FIG. 17 using a load Zn connected in parallel with a capacitor Cn and in series with a switch Qn. The output channel 808n further includes a sense resistor Rsn connected to the switch Qn.

The overvoltage protection circuit 1700 may comprise a zener diode D1. A status of the voltage across the capacitor may be captured by the overvoltage protection circuit 1700 with the zener diode D1. When the voltage across the capacitor Cn exceeds the predetermined threshold voltage, the zener diode D1 conducts, which turns "on" switch $Q_2$, driving optocoupler U1 and causing the output OV of the overvoltage protection circuit 1700 to transition high. The output OV of the overvoltage protection circuit 1700 may be sent to an input of the controller 812. When the controller 812 detects the output OV has transitioned high, the controller 812 may be configured to shut down the SIMO converter 801.

As previously mentioned, the load capacitors Cn may be configured in the SIMO converter 801 such that they are not connected to ground. In order to detect the voltage across the load capacitors Cn when they are not connected to ground, the overvoltage protection circuitry may further comprise isolation circuitry 1710. In one example, the isolation circuitry 1710 comprises an optocoupler having an output that drives the output signal OV. The optocoupler may comprise a diode D2 in communication with a transistor $Q_2$. In the example overvoltage protection circuit 1700, the optocoupler 1710 is driven by transistor $Q_1$. The optocoupler provides an isolation barrier between the load capacitor Cn and the output OV.

Referring back to FIG. 16, the system may further comprise phase detection module 1606. The phase detection module 1606 may be used to determine the relative phase of the input voltage Vin. The relative phase of the input voltage Vin may be determined for two reasons. First, as previously described, by sampling the output voltage $V_{out}$ supplied by the integrator 1400 at a sampling rate where the net current through the capacitor Cn over the sample period is zero, the average current flowing through the load Zn may be determined by measuring the current or voltage across the sense resistor Rsn. The sampling rate, as well as timing of the samples which may be taken at specific points relative to the input waveform, may be determined by determining the relative phase of the input voltage Vin. Additionally, if any frequency drift on the line voltage occurs or if the SIMO converter 801 is configured to operate with foreign power grids, then the phase detection module 1606 may be used to adjust a current sample time and/or apply an offset so that the accumulator module 822 may operate properly.

Figure 18:
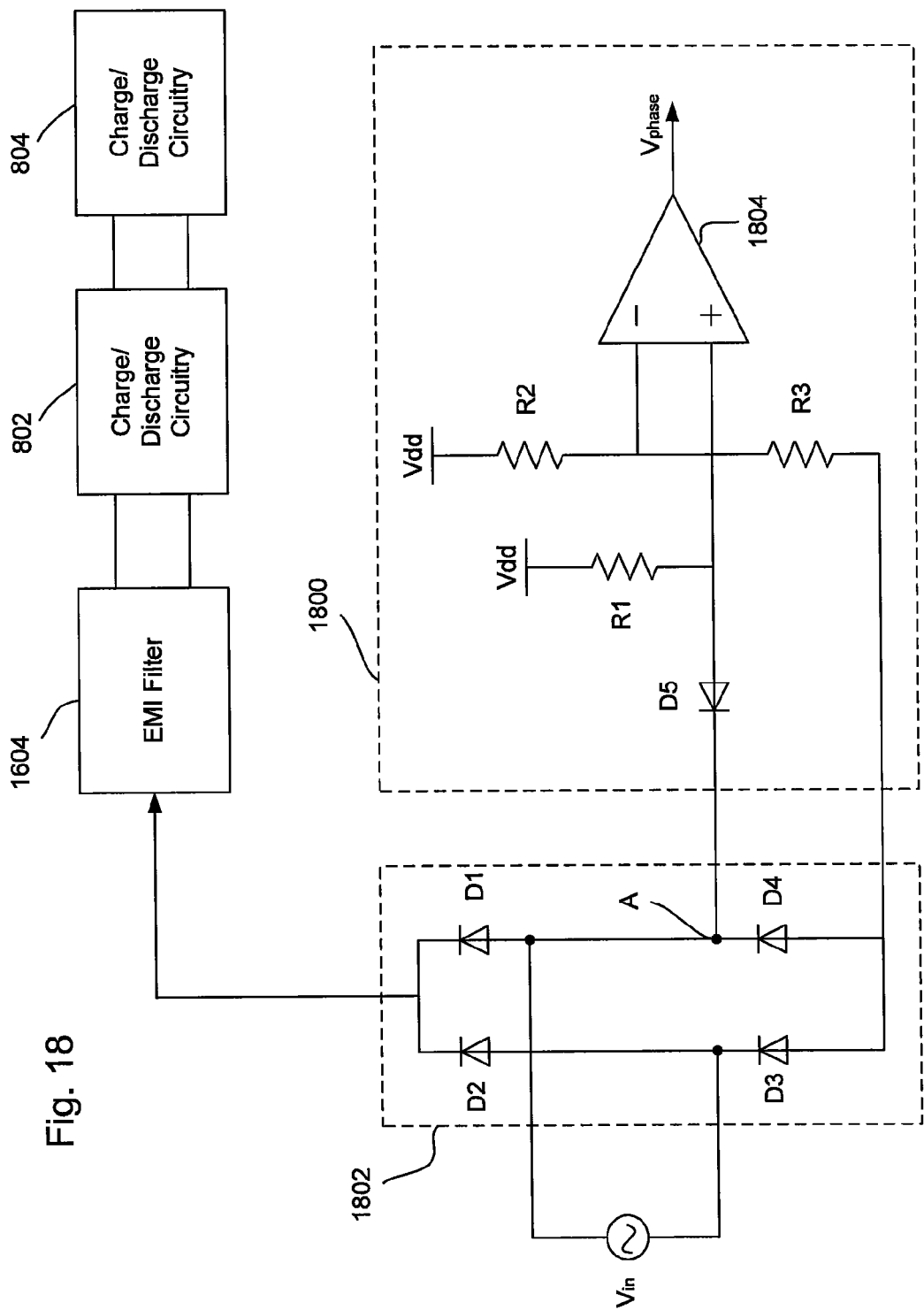
FIG. 18 shows an example phase detection circuit that may be used as the phase detection module in the alternative system shown in FIG. 16.

FIG. 18 shows example phase detection circuitry 1800 that may be used as the phase detection module 1606 in the system 1600. The phase detection circuitry 1800 may be connected to a rectifier 1802, which may be used as the rectifier 1602 shown in FIG. 16. Diodes D1, D2, D3, D4 may be configured as a bridge rectifier and rectify a received sinusoidal input Vin. The phase detection circuitry 1800 may be connected to the bridge rectifier 1802 at node A where diode D1 is connected to diode D4. The phase detection circuitry 1800 may comprise a comparator 1804, which may be an operational amplifier (op-amp) in some examples. The comparator 1804 is configured to output an output signal $V_{phase}$ that is low when current is flowing through the diode D4 in the rectifier 1802, and is high otherwise. The output signal $V_{phase}$ may be indicative of whether the input signal Vin is positive or negative. The comparator 1804 is configured to output $V_{phase}$ as either high or low by comparing a reference or zero-cross voltage connected to the negative terminal of the op-amp with a voltage at node A. The zero-cross voltage may be dependent upon the DC voltage Vdd and the resistors R2 and R3. During a cycle of the sinusoidal input Vin, the diode D4 is conducting for the half of the cycle that the sinusoidal input Vin is negative and not conducting for the half of the cycle that the sinusoidal input Vin is positive. When the sinusoidal input Vin is negative, then the diode D4 is conducting and the voltage across the diode D4 (and at node A) is relatively small, causing the voltage at the positive terminal of the comparator 1804 to be pulled low. When the voltage at the positive terminal is pulled low, the voltage at node A is less than the zero-cross voltage, and the comparator 1804 outputs $V_{phase}$ as low. Alternatively, when the sinusoidal input Vin in positive, the diode D4 is not conducting and the voltage across the diode D4 (and at node A) is relatively high, causing the voltage at the positive terminal of the comparator 1804 to be pulled high. When the voltage at the positive terminal is pulled high, the voltage at node A is greater than the zero-cross voltage, and the comparator 1804 outputs $V_{phase}$ as high.

The output $V_{phase}$ of the phase detection circuitry 1700 may be sent to an input of the sampler 824 and be used to determine the sample rate of the sampler 824 and/or specific sample times with respect to the input waveform. Referring back to FIG. 16, in an alternative configuration, rather than connect the phase detection module 1606 to node A of the bridge rectifier, the phase detection module 1606 may be connected to the SIMO converter 801 in between the rectifier 1602 and the charge/discharge circuitry 802, as indicated by the dotted line shown in FIG. 16. In the alternative configuration, the phase detection module 1606 may comprise feedback circuitry that outputs a value of the input waveform, rather than a phase value, to the controller 812. For the alternative configuration, the phase detection module may comprise resistor divider circuitry. The controller 812 may be configured to compare the output of the phase detection module 1606 with a predetermined value, which may be zero or a value close to zero. When the controller 812 detects that the output of the phase detection module 1606 is within the predetermined value, the controller 812 detects a zero-crossing and sets the sample rate of the sampler 824 accordingly.

Figure 19:
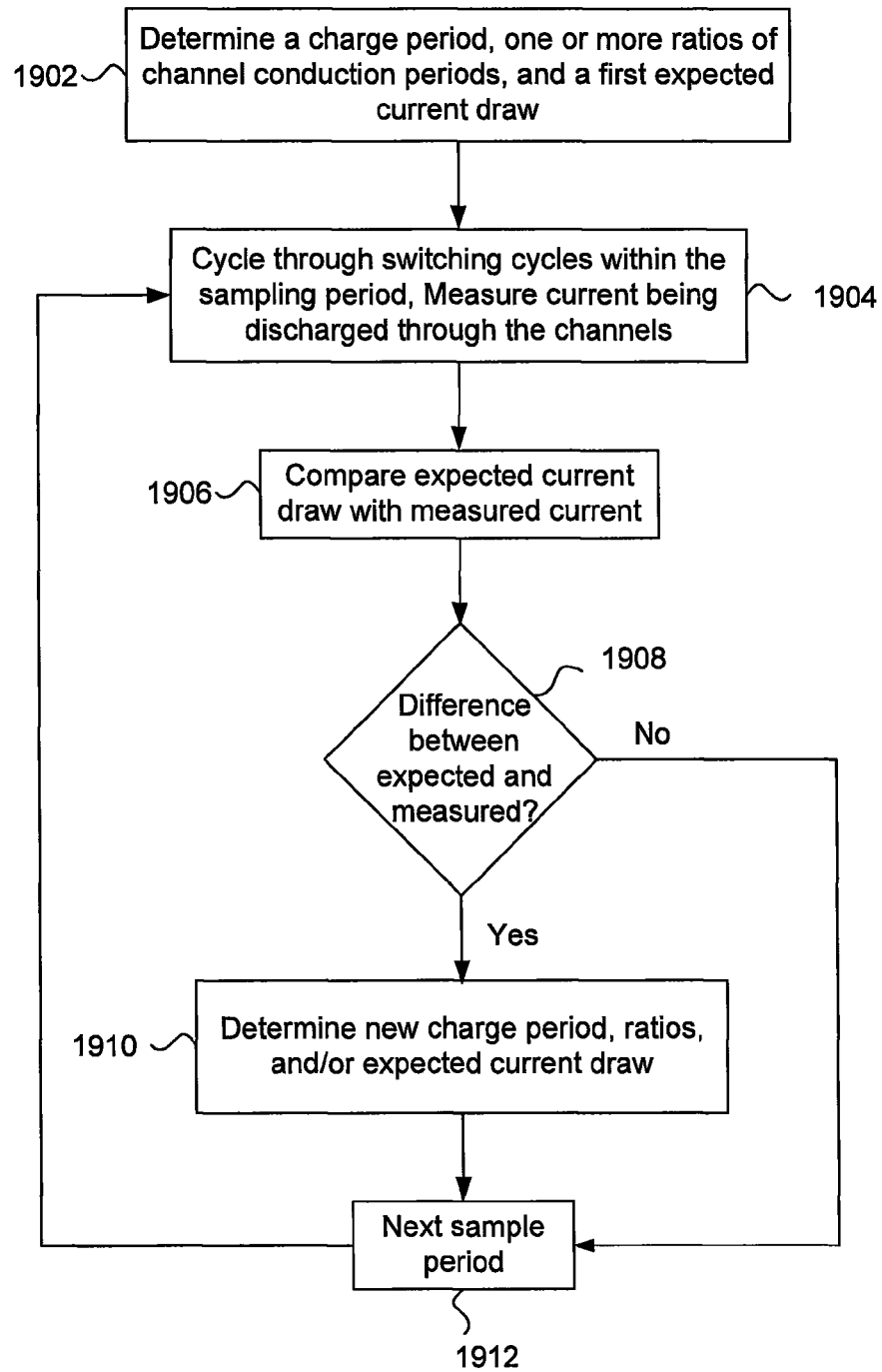
FIG. 19 shows a flow chart of an example method that may be used to control, measure, and monitor current conduction through a SIMO converter.

FIG. 19 shows a flow chart of an example method 1900 that may be used to control, measure, and monitor current conduction through a SIMO converter. The method begins at block 1902 where for a first switching cycle a charge period, one or more ratios between channel conduction periods and a first expected current draw are determined. As previously described, the expected current draw may be a predetermined value and/or may comprise a plurality of currents through each of the output channels of the SIMO converter. At block 1904, the SIMO converter cycles through a plurality of switching cycles within a sampling period, and the main switching circuitry and the output switches are switched "on" and "off" in accordance with timing parameters, arrangements of current conduction, relationships in switching between the main switching circuitry and the output switches and/or between the output switches, switch timing schemes, and/or arrangements or sequences of orders in which the output channels conduct current. Additionally, at block 1904, current drawn through the output channels is measured and accumulated over the sampling period. At block 1906, a sample of the actual current drawn through the output channels, such as on an output channel basis, is taken over the sampling period, and the actual current drawn is compared to one or more expected current draw values. At block 1908, one or more differences between the actual current drawn and the expected current draw are determined. If one or more differences are determined, then at block 1910, one or more of the timing parameters, such as the charge period and the ratios between the channel conduction periods, and/or a new expected current draw may be determined. At block 1912, the method proceeds to the next sample period where the method repeats at 1904 and the SIMO converter cycles through the switching cycles over the next sample period. Referring back to block 1908, if no differences between the actual current drawn and the expected current draw are determined, then the method may proceed directly to the next sample period at block 1912.

Figure 20:
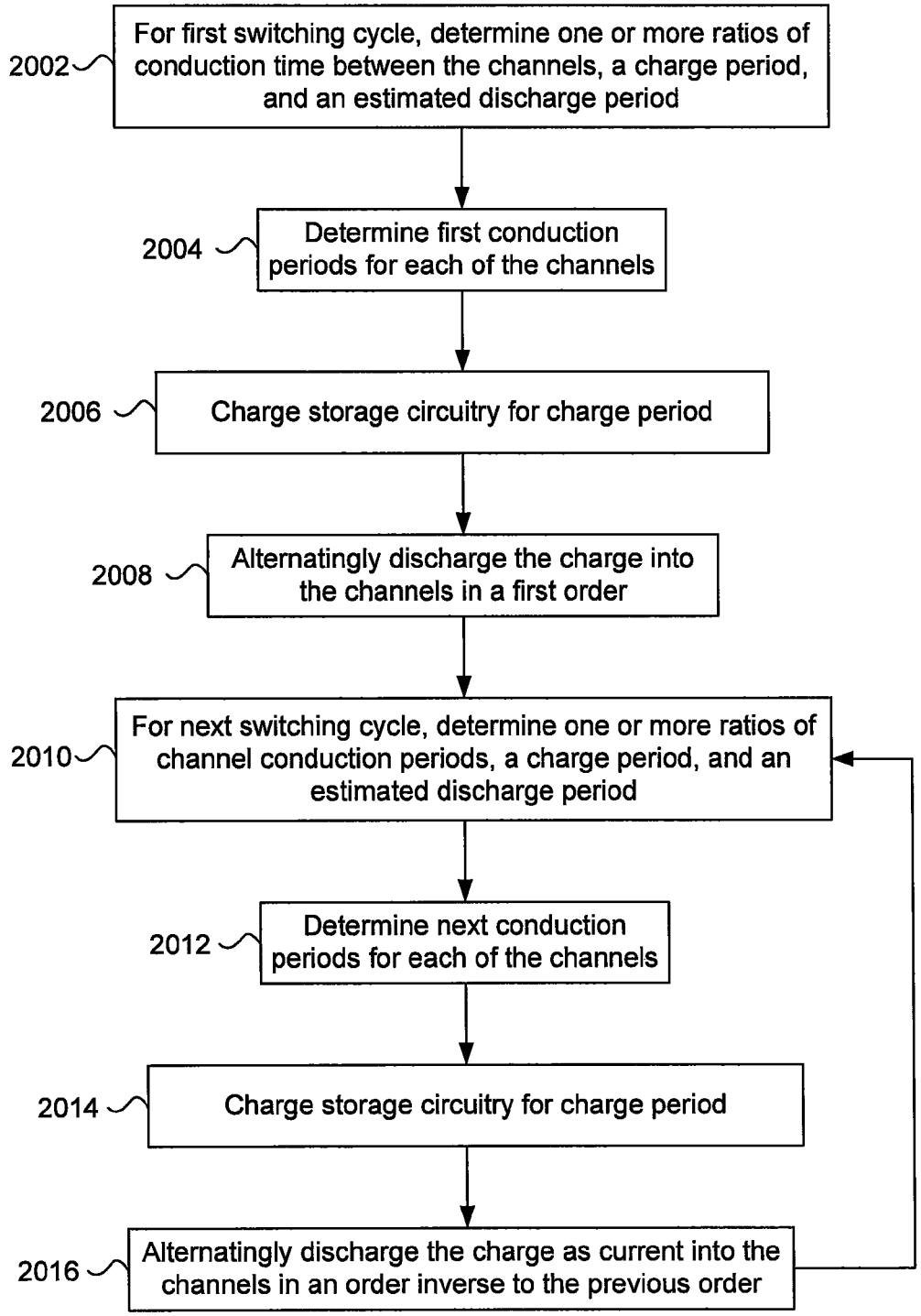
FIG. 20 shows a flow chart of an example method that may be used to determine an arrangement or sequence of switching orders of switching main and output switches in a SIMO converter for a fixed ratio switch timing scheme.

FIG. 20 shows a flow chart of an example method 2000 that may be used to determine an arrangement or sequence of switching orders of switching main and output switches in a SIMO converter for a fixed ratio switch timing scheme. At block 2002, for a first switching cycle, one or more ratios between channel conduction periods, a charge period, and a discharge period are determined. In one example, for the first switching cycles, the ratios, the charge period, and/or the discharge period may initially be set to zero. At block 2004, first channel conduction periods may be determined. The channel conduction periods may be determined by multiplying the expected discharge period with the ratios for each of the output channels. At block 2006, current is stored in storage circuitry of the SIMO converter. As previously described, the current may be stored in the storage circuitry by turning "on" main switching circuitry connected to the storage circuitry. At block 2008, the stored current may be alternatingly discharged through the output channels in a first order. As an example, the first order may be drawing current through a first channel, then drawing current through a second channel, and then drawing current through a final channel. Also, at block 2008, an actual discharge period may be determined for the first switching cycle by identifying when no more current is being discharged from the storage circuitry. At block 2010, for the next switching cycle, one or more timing parameters, including the ratios between the channel conduction periods and/or charge period, may be determined. The determination may include determining whether to change the ratios and/or the charge period for the next switching cycle based on a comparison of measured current drawn through the output channels with an expected current draw. In one example, if the next switching cycle is also the first switching cycle of the next sampling period, the determination of whether to change the ratios and/or the charge period may be made. Alternatively, if the next switching cycle is not also the first switching cycle of the next sampling period, then the determination may comprise determining not to change the ratios and/or the charge period. In addition, the determination may be made without comparing an actual drawn current with an expected current draw. In addition, at block 2010, an estimated discharge period for the next switching cycle may be determined. The estimated discharge period may include an actual discharge period of the current switching cycle. At block 2012, channel conduction periods for the next switching cycle may be determined. The channel conduction periods may be determined by multiplying the estimated discharge period with the ratios between the channel conduction periods. At block 2014, for the next switching cycle, current is charged in the storage circuitry during the charge period. At block 2016, current is alternatingly drawn through the output channels in an order that is the reverse of the order for the previous switching cycle. As an example, the reverse order to the first order may be drawing current through the final channel, then drawing current through the second channel, and then drawing current through the first channel. Also, at block 2016, current drawn through the output channels may be accumulated and an actual discharge period may be determined. The method proceeds back to block 2010 for the next switching cycle, where ratios of channel conduction periods, a charge period, and an estimated discharge period are determined. Alternatively, as previously described, the ratios of channel conduction periods, the charge period, and the estimated discharge period may not be determined for the next switching cycle. Instead, those parameters may be determined after a plurality of switching cycles have passed. For example, the parameters may be determined for every third switching cycle or every tenth switching cycle.

Figure 21:
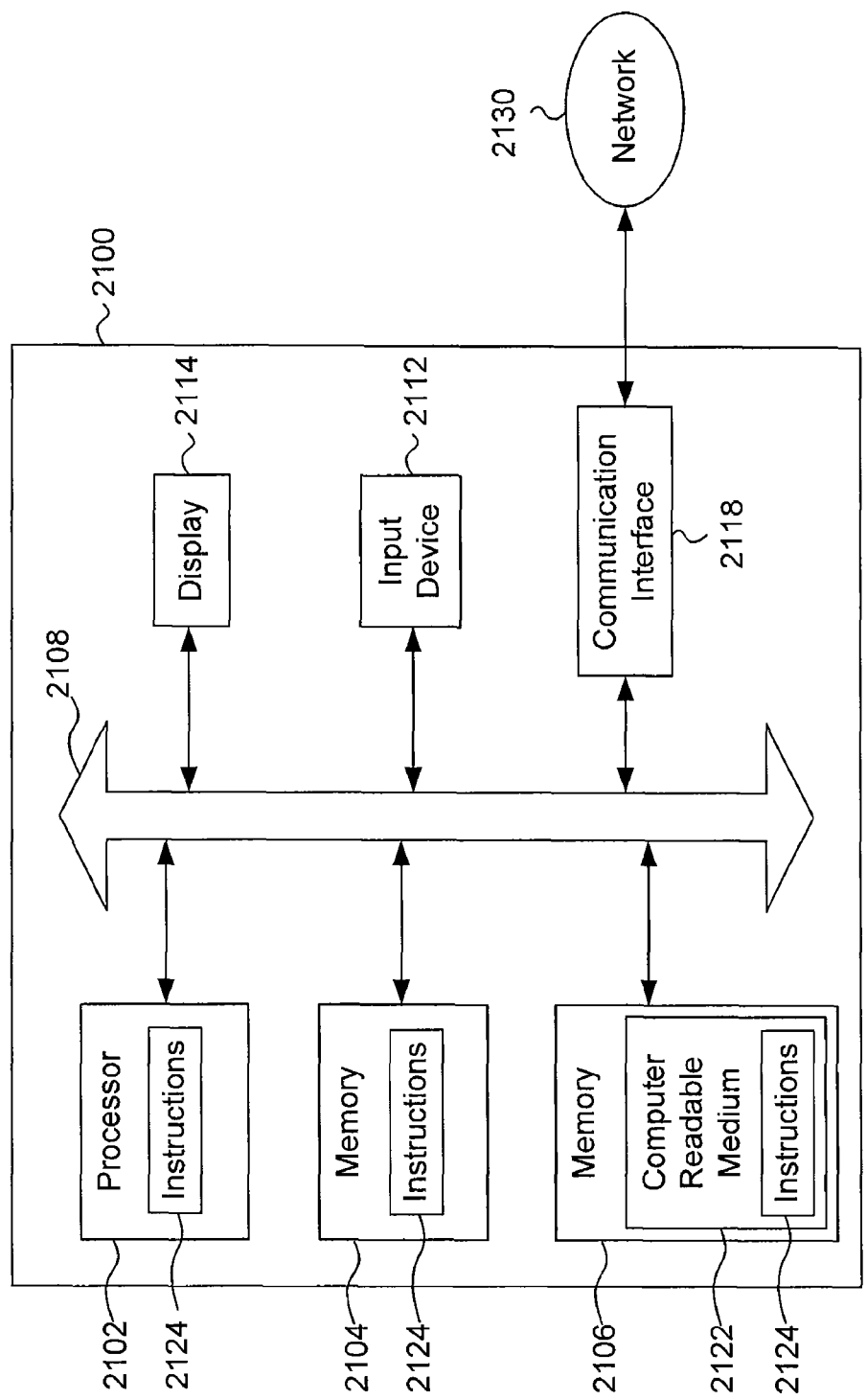
FIG. 21 is an example computer system that may represent a controller and/or one or more components of the controller.

FIG. 21 shows a general computer system 2100, which may represent the controller 812 and/or one or more of the signal generator module 820, the accumulator module 822, the sampler module 824, the comparator 826, and compensation module 828, the timer module 830, and the zero detector module 832. The computer system 2100 may include a set of instructions 2124 that may be executed to cause the computer system 2100 to perform any one or more of the methods or computer based functions disclosed herein. The computer system 2100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 2100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a smart camera, a video camera, a scanner, a facsimile machine, a printer, a pager, a personal trusted device, a web appliance, a network router, switch or bridge, or any other machine capable of executing a set of instructions 2124 (sequential or otherwise) that specify actions to be taken by that machine. In a particular embodiment, the computer system 2100 may be implemented using electronic devices that provide voice, video or data communication. Further, while a single computer system 2100 may be illustrated, the term "system" shall also be taken to include any collection of systems or sub-systems that individually or jointly execute a set, or multiple sets, of instructions to perform one or more computer functions.

As illustrated in FIG. 21, the computer system 2100 may include a processor 2102, such as, a central processing unit (CPU), a graphics processing unit (GPU), or both. The processor 2102 may be a component in a variety of systems. For example, the processor 2102 may be part of a standard personal computer or a workstation. The processor 2102 may be one or more general processors, digital signal processors, application specific integrated circuits, field programmable gate arrays, servers, networks, digital circuits, analog circuits, combinations thereof, or other now known or later developed devices for analyzing and processing data. The processor 2102 may implement a software program, such as code generated manually (i.e., programmed).

The computer system 2100 may include a memory 2104 that can communicate via a bus 2108. The memory 2104 may be a main memory, a static memory, or a dynamic memory. The memory 2104 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 2104 may include a cache or random access memory for the processor 2102. Alternatively or in addition, the memory 2104 may be separate from the processor 2102, such as a cache memory of a processor, the system memory, or other memory. The memory 2104 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 2104 may be operable to store instructions 2124 executable by the processor 2102. The functions, acts or tasks illustrated in the figures or described herein may be performed by the programmed processor 2102 executing the instructions 2124 stored in the memory 2104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 2100 may further include a display 2114, such as a liquid crystal display (LCD), an organic light emitting diode (OLED), a flat panel display, a solid state display, a cathode ray tube (CRT), a projector, a printer or other now known or later developed display device for outputting determined information. The display 2114 may act as an interface for the user to see the functioning of the processor 2102, or specifically as an interface with the software stored in the memory 2104 or in the drive unit 2106.

Additionally, the computer system 2100 may include an input device 2112 configured to allow a user to interact with any of the components of system 2100. The input device 2112 may be a number pad, a keyboard, or a cursor control device, such as a mouse, or a joystick, touch screen display, remote control or any other device operative to interact with the system 2100.

The computer system 2100 may also include a disk or optical drive unit 2106. The disk drive unit 2106 may include a computer-readable medium 2122 in which one or more sets of instructions 2124, e.g. software, can be embedded. The computer-readable medium 2122 may be a non-transitory computer-readable medium, a computer-readable storage medium, and/or a combination thereof. Further, the instructions 2124 may perform one or more of the methods or logic as described herein. The instructions 2124 may reside completely, or at least partially, within the memory 2104 and/or within the processor 2102 during execution by the computer system 2100. The memory 2104 and the processor 2102 also may include computer-readable media as discussed above.

The present disclosure contemplates a computer-readable medium 2122 that includes instructions 2124 or receives and executes instructions 2124 responsive to a propagated signal; so that a device connected to a network 2130 may communicate voice, video, audio, images or any other data over the network 2130. Further, the instructions 2124 may be transmitted or received over the network 2130 via a communication interface 2118. The communication interface 2118 may be a part of the processor 2102 or may be a separate component. The communication interface 2118 may be created in software or may be a physical connection in hardware. The communication interface 2118 may be configured to connect with a network 2130, external media, the display 2114, or any other components in system 2100, or combinations thereof. The connection with the network 2130 may be a physical connection, such as a wired Ethernet connection or may be established wirelessly as discussed below. Likewise, the additional connections with other components of the system 2100 may be physical connections or may be established wirelessly. In the case of a service provider server, the service provider server may communicate with users through the communication interface 2118.

The network 2130 may include wired networks, wireless networks, or combinations thereof. The wireless network may be a cellular telephone network, an 802.11, 802.16, 802.20, or WiMax network. Further, the network 2130 may be a public network, such as the Internet, a private network, such as an intranet, or combinations thereof, and may utilize a variety of networking protocols now available or later developed including, but not limited to TCP/IP based networking protocols.

The computer-readable medium 2122 may be a single medium, or the computer-readable medium 2122 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein. In addition or alternatively, the computer-readable medium 2122 may be a computer-readable storage medium and/or a non-transitory computer-readable medium.

The computer-readable medium 2122 may include a solid-state memory such as a memory card or other package that houses one or more non-volatile read-only memories. The computer-readable medium 2122 also may be a random access memory or other volatile re-writable memory. Additionally, the computer-readable medium 2122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations. The modules, as described above with reference to FIG. 8 may be software modules, firmware modules, hardware modules, or a combination thereof. The modules may be stored in memory and/or executable by a processor.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The foregoing detailed description has described only a few of the many possible implementations of the present invention. For this reason, this detailed description is intended by way of illustration, and not by way of limitation.

I claim:

1. A method of controlling current conduction in a single-inductor-multiple-output (SIMO) converter comprising storage circuitry in communication with a plurality of output channels, the method comprising:
    measuring, with at least one first controller, current drawn through the plurality of output channels over a current sample period, wherein the current sample period extends over multiple switching cycles, and wherein each of the plurality of output channels is configured to draw current during each of the multiple switching cycles;
    determining, with at least one second controller, whether to change an amount of current being conducted in the SIMO converter for a next sample period based on a comparison between the measured current drawn over the current sample period and a predetermined current draw.

2. The method of claim 1, wherein determining, with the at least one second controller, whether to change the amount of current being conducted for the next sample period comprises:
    determining whether to change at least one of a charge period or one or more channel conduction periods.

3. The method of claim 1, further comprising:
    determining, with at least one third controller, fixed channel conduction periods for the plurality of output channels for the current sample period.

4. The method of claim 1, further comprising:
    determining, with at least one third controller, one or more fixed ratios of channel conduction periods between the plurality of output channels for the current sample period.

5. The method of claim 4, further comprising:
    determining, with at least one fourth controller, whether to change one or more of the one or more fixed ratios of channel conduction periods based on the comparison, wherein determining whether to change one or more channel conduction periods is based on determining whether to change one or more of the one or more fixed ratios.

6. The method of claim 1, wherein the current sample period is over a quarter-cycle of a rectified alternating current (AC) input signal.

7. The method of claim 1, wherein the comparison of the measured current draw with the predetermined current draw comprises a comparison of a measured current draw with a predetermined current draw for each of the plurality of output channels.

8. The method of claim 1, further comprising:
    determining, with at least one third controller, a difference between the predetermined current draw and the measured current draw; and
    changing, with at least one fourth controller, the predetermined current draw for the next sample period based on the determined difference.

9. The method of claim 1, further comprising:
    increasing, with at least one third controller, at least one of a charge period or one or more channel conduction periods for the next sample period if the measured current draw through the plurality of output channels for the current sample period is less than the predetermined current draw; and
    decreasing, with at least one fourth controller, at least one of the charge period or one or more of the channel conduction periods for the next sample period if the measured current draw through the plurality of output channels for the current sample period is more than the predetermined current draw.

10. The method of claim 1, further comprising:
    determining, with at least one third controller, an arrangement of orders in which to discharge the stored current into the plurality of output channels over the plurality of switching cycles in the current sample period; and
    outputting, with at least one fourth controller, switching signals to draw the current through the output channels over the plurality of switching cycles in accordance with the arrangement.

11. The method of claim 10, wherein the arrangement comprises:
    a first order in which the plurality of output channels draw current during a current switching cycle of the plurality of switching cycles; and a second order in which the plurality of output channels draw current during a previous switching cycle of the plurality of switching cycles, wherein the second order is a reverse order of the first order.

12. The method of claim of claim 10, wherein the arrangement is determined for one of consolidated sequencing, interleaved sequencing, or commutated sequencing.

13. The method of claim 1, further comprising:
determining, with at least one third controller, channel conduction periods for the current sample period for one of continuous current conduction or discontinuous current conduction.

14. The method of claim 1, wherein each of the plurality of output channels comprises a light emitting diode (LED) configured as a load of the output channel,
wherein the predetermined current draw is a value based on a predetermined light output of the LEDs in the plurality of output channels.

15. The method of claim 14, further comprising:
determining, with at least one third controller, whether to change the predetermined current draw based on a change in the predetermined light output.

16. The method of claim 1, further comprising:
determining, with at least one third controller, whether to change one or more duty cycles of one or more signals sent to the SIMO converter to control the current conduction for the next sample period based on determining whether to change the amount of current being conducted.

17. The method of claim 1, wherein the first controller and the second controller are the same controller.

18. The method of claim 1, wherein the first controller and the second controller are different controllers.

19. A controller system configured to control current conduction in a single-inductor-multiple output (SIMO) converter that comprises a plurality of output channels, the controller system comprising:
an accumulator module that is configured to measure current drawn through the plurality of channels over a current sample period, wherein the current sample period extends over multiple switching cycles, and wherein each of the plurality of output channels is configured to draw current during each of the multiple switching cycles; and
a compensator module that is configured to determine whether to change an amount of current being conducted in the SIMO converter for a next sample period based on a comparison between the measured current drawn and a predetermined current draw.

20. The controller system of claim 19, wherein the compensator module is configured to determine whether to change at least one of a charge period or one or more channel conduction periods based on the comparison.

21. The controller system of claim 19, further comprising a signal generator module that is configured to:
determine fixed channel conduction periods for the plurality of output channels for the current sample period.

22. The controller system of claim 19, further comprising a signal generator module that is configured to:
determine one or more fixed ratios of channel conduction periods between the plurality of output channels for the current sample period.

23. The controller system of claim 22, wherein the compensator module is further configured to:
determine whether to change one or more of the one or more fixed ratios of channel conduction periods based on the comparison,
wherein the determination of whether to change one or more channel conduction periods is based on a determination of whether to change one or more of the one or more fixed ratios.

24. The controller system of claim 19, wherein the current sample period is over a quarter-cycle of a rectified alternating current (AC) input signal.

25. The controller system of claim 19, further comprising a comparator module that is configured to compare a measured current draw with a predetermined current draw for each of the plurality of output channels to perform the comparison of the measured current draw with the predetermined current draw.

26. The controller system of claim 19, further comprising a comparator module that is configured to determine a difference between the measured current draw and the predetermined current draw,
wherein the compensator module is configured to change the predetermined current draw for the next sample period based on the determined difference.

27. The controller system of claim 19, wherein the compensator module is further configured to:
increase at least one of the charge period or one or more of the channel conduction periods for the next sample period if the measured current draw through the plurality of output channels for the current sample period is less than the predetermined current draw; and
decrease at least one of the charge period or one or more of the channel conduction periods for the next sample period if the measured current draw through the plurality of output channels for the current sample period is more than the predetermined current draw.

28. The controller system of claim 19, further comprising a signal generator module that is configured to:
determine an arrangement of orders in which to discharge the stored current into the plurality of output channels of the SIMO converter over a plurality of switching cycles in the current sample period; and
output switching signals to draw the current through the output channels over the plurality of switching cycles in accordance with the arrangement.

29. The controller system of claim 28, wherein the arrangement comprises:
a first order in which the plurality of output channels draw current during a current switching cycle of the plurality of switching cycles; and
a second order in which the plurality of output channels draw current during a previous switching cycle of the plurality of switching cycles,
wherein the second order is a reverse order of the first order.

30. The controller system of claim of claim 28, wherein the arrangement is determined for one of consolidated sequencing, interleaved sequencing, or commutated sequencing.

31. The controller system of claim 19, further comprising a signal generator module that is configured to:
determine channel conduction periods for the current sample period for one of continuous current conduction or discontinuous current conduction.

32. The controller system of claim 19, wherein each of the plurality of output channels comprises a light emitting diode (LED) configured as a load of the output channel,
wherein the desired current draw is a predetermined value based on a predetermined light output of the LEDs in the plurality of output channels.

33. The controller system of claim 32, wherein the compensator module is further configured to:

determine whether to change the predetermined current draw based on a change in the predetermined light output.

34. The controller system of claim 19, wherein the compensator module is further configured to:
determine whether to change one or more duty cycles of one or more signals sent to the SIMO converter to control the current conduction for the next sample period based on the determination of whether to change the amount of current being conducted.

35. The controller system of claim 19, wherein each of the plurality of output channels comprises a load, wherein one or more of the loads are floating with respect to ground.

36. The controller system of claim 35, wherein each of the plurality of output channels further comprises an output switch and a sense resistor in communication with the load, wherein at least one of the output switch and the sense resistor is referenced to a common ground.

37. The controller system of claim 19, wherein the SIMO converter comprises a flyback converter.

38. The controller system of claim 19, wherein the SIMO converter comprises a boost converter.

39. The controller system of claim 19, wherein the SIMO converter comprises a buck converter.

\* \* \* \* \*